United States Patent
Seidl et al.

(10) Patent No.: US 9,963,026 B2
(45) Date of Patent: May 8, 2018

(54) CONVERTIBLE VEHICLE HAVING A BACKBENCH AND A WIND DEFLECTOR ARRANGEMENT

(71) Applicant: Webasto-Edscha Cabrio GmbH, Stockdorf (DE)

(72) Inventors: Richard Seidl, Stockdorf (DE); Alexander Haimerl, Stockdorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days. days.

(21) Appl. No.: 15/380,750

(22) Filed: Dec. 15, 2016

(65) Prior Publication Data

US 2017/0174063 A1  Jun. 22, 2017

(30) Foreign Application Priority Data

Dec. 22, 2015  (DE) .......................... 10 2015 122 582

(51) Int. Cl.
*B60J 7/22* (2006.01)
*F16H 19/00* (2006.01)
*F16H 21/40* (2006.01)
*F16H 25/20* (2006.01)

(52) U.S. Cl.
CPC ............ *B60J 7/223* (2013.01); *F16H 19/001* (2013.01); *F16H 21/40* (2013.01); *F16H 25/20* (2013.01)

(58) Field of Classification Search
CPC ....................................................... B60J 7/223
USPC .................................. 296/85, 180.1, 136.03
See application file for complete search history.

(56) References Cited

U.S. PATENT DOCUMENTS

| 5,253,916 | A | * | 10/1993 | Moore | ..................... B60J 7/223 296/180.5 |
| 6,030,027 | A | * | 2/2000 | Graf | ........................ B60J 7/223 296/180.1 |
| 7,399,025 | B2 | * | 7/2008 | Hermann | ................. B60J 7/223 296/180.1 |
| 7,559,600 | B2 | * | 7/2009 | Neubrand | ................ B60J 7/223 296/180.1 |
| 8,602,484 | B2 | * | 12/2013 | Geissenhoner | .......... B60J 7/223 296/107.08 |

FOREIGN PATENT DOCUMENTS

| DE | 40 18 862 A1 | 1/1992 |
| DE | 295 15 190 U1 | 11/1995 |
| DE | 10220029 | * 11/2003 |
| DE | 10 2006 008 653 A1 | 8/2007 |

* cited by examiner

*Primary Examiner* — Dennis H Pedder
(74) *Attorney, Agent, or Firm* — Fitch, Even, Tabin & Flannery, LLP

(57) ABSTRACT

A convertible vehicle having a backbench and a wind deflector arrangement which can be displaced between a storage position and at least one function position and has at least one function element having a roller web, which is wound up on a winding device extending in the transverse direction of the vehicle when in the storage position and is unwound from the winding device when in the function position. The winding device arranged at a wind deflector carrier is arranged at a frontal, forward-facing corner area of a sitting area of the backbench and can be released into the function position by a releasing mechanism for displacing the wind deflector arrangement.

15 Claims, 31 Drawing Sheets

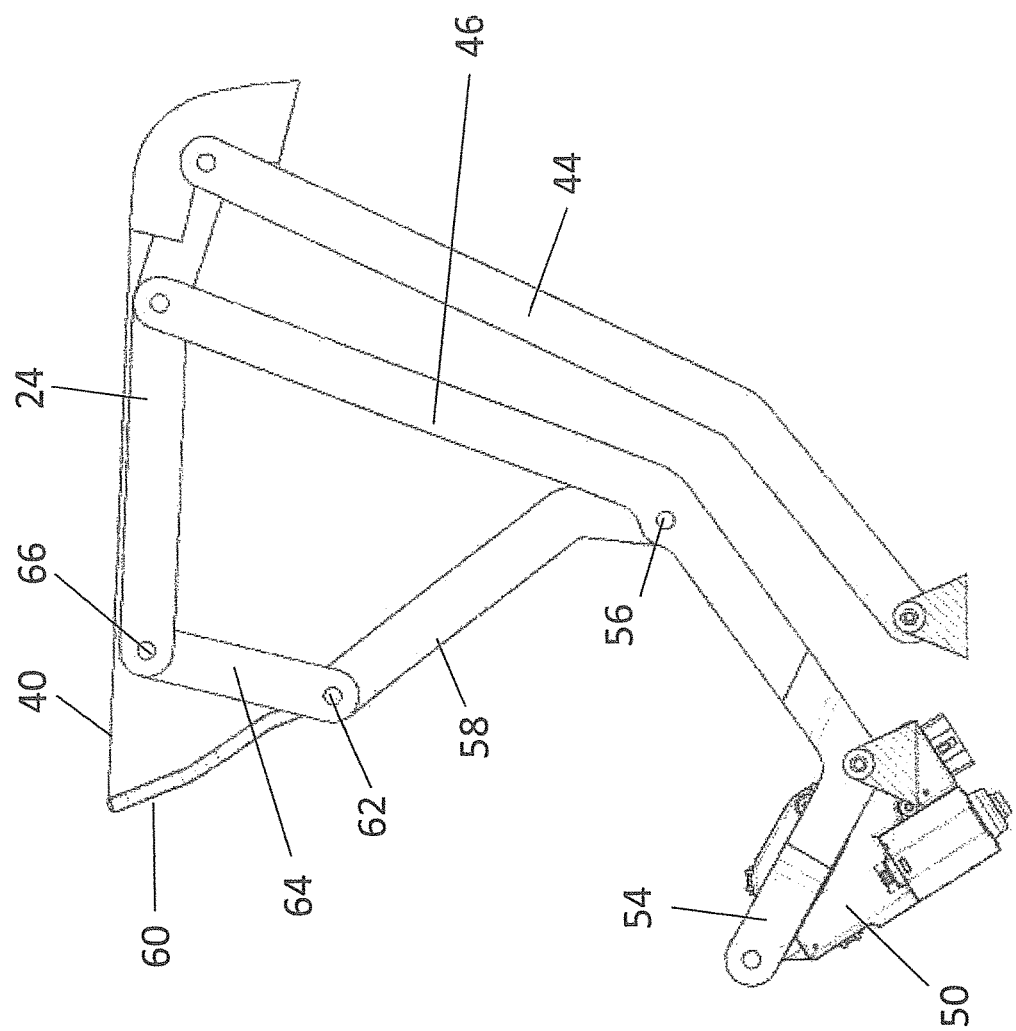

CONVERTIBLE VEHICLE HAVING A BACKBENCH AND A WIND DEFLECTOR ARRANGEMENT

CROSS-REFERENCE TO RELATED APPLICATION

This application claims priority from German Application No. 10 2015 122 582.4, filed Dec. 22, 2015, which is hereby incorporated herein by reference in its entirety for all purposes.

FIELD

The invention relates to a convertible vehicle having the features of the preamble of claim 1.

BACKGROUND

Such a convertible vehicle is known from document DE 40 18 862 A1 and comprises a vehicle interior in which a driver's seat, a passenger seat and a backbench arranged in a back of the car are arranged. The vehicle is provided with a top which can be displaced between a closing position spanning the vehicle interior and a storage position releasing the vehicle interior upward. In order to minimize air drafts and turbulences in the area of the vehicle interior when the top is in the storage position, the vehicle is provided with a wind deflector arrangement which comprises a roller web as a function element which can be displaced between a wound-up storage position and an unwound function position. In the function position, the roller web spans a vertical function plane extending in the transverse direction of the vehicle. A winding device for the roller web is permanently mounted at the front edge of a seating element of the back bench. Moreover, a wind deflector arrangement having two roller webs is known from this document, said roller webs being able to be wound up into a casing arranged at the level of the belt line of the vehicle, one of said roller webs being able to be extracted in a horizontal direction while the other can be extracted in a vertical direction. The casing of the wind deflector arrangement, however, has to be manually removed from the vehicle interior when there are passengers seated on the backbench.

SUMMARY

The object of the invention is to create a convertible vehicle having a backbench according to the type described above which comprises a wind deflector arrangement which can be used in various ways.

The object of the invention is attained by the convertible vehicle having the features of the claim 1.

The wind deflector arrangement of the convertible vehicle according to the invention can therefore either be lifted or released from its lowered storage position for being displaced in the function position by means of the releasing mechanism. In the lowered storage position, the winding device, on which the roller web can be wound, is arranged at the frontal, forward-facing corner area of the sitting area, so that anyone using the backbench can place their legs over the winding device and the roller web wound-up thereon. In the storage position, therefore, the wind deflector arrangement will not be bothersome to passengers sitting in the back of the vehicle. In a released position of the winding device, the roller web can be unwound from the winding device for forming a function element.

The wind deflector arrangement according to the invention can be used in generally any convertible vehicle comprising a backbench. The roller web can have a width in the transverse direction of the vehicle which corresponds to the width of the backbench. The backbench can be formed as a single element or consist of single backseats, the latter either being adjacent to each other or separated by a center console or the like.

In a preferred embodiment of the convertible vehicle according to the invention, the winding device is arranged in a wind deflector housing which forms the frontal, forward-facing end area of the sitting area of the backbench when in the storage position. The wind deflector casing, which is a roller web cassette, therefore preferably comprises a design or rather shape fitted to the shape of the backbench. Furthermore, the wind deflector casing, which comprises a slit for the roller web, can be padded in order to not impair the sitting comfort of passengers in the rear of the vehicle.

In a specific embodiment of the convertible vehicle according to the invention, the wind deflector casing forms a frame leg of a wind deflector frame extending in the transverse direction of the vehicle, said wind deflector frame being part of the wind deflector carrier and comprising a frame leg on each side extending in the longitudinal direction of the vehicle regarding a vertical longitudinal center plane of the vehicle. Preferably, the wind deflector frame does not form a closed frame but rather an open frame having solely the frame leg forming the wind deflector casing and the two frame legs extending in the longitudinal direction of the vehicle.

In order to be able to pivot the wind deflector carrier between the lowered storage position and an either elevated or released releasing position in a specific embodiment of the convertible vehicle according to the invention, the releasing mechanism comprises two releasing links forming a four joint arrangement on each side regarding the vertical longitudinal center plane of the vehicle, said releasing links being mounted permanently to the vehicle in a pivotable manner and connected to the wind deflector carrier. The releasing links are mounted to a main bearing of the wind deflector arrangement mounted permanently to the vehicle, for example. A drive motor for actuating one of the releasing links can be arranged at each of the main bearings. Coupling between the corresponding releasing link and a drive shaft of the drive motor can be realized via a drive link which is part of a transmission.

Generally, the function element can be a horizontal function element which spans an essentially horizontal function plane in its function position or it can be a vertical function element which spans an essentially vertical function plane in its function position.

However, the wind deflector arrangement according to the invention can also comprise two function elements formed as a roller web, one of which forms a horizontal function element and the other forms a vertical function element.

If the function element forms a horizontal function element, it can be connected to a clamping link arrangement on each side regarding the vertical longitudinal center plane of the vehicle, said clamping link being coupled to the releasing mechanism.

In a specific embodiment of the convertible vehicle according to the invention, the clamping link arrangements each comprise a first displacing link articulated to the releasing mechanism on the one hand and to a clamping bracket on the other hand, to which the horizontal function element is tied at its edge facing away from the winding device, as well as a second displacing link articulated to the first displacing link on the one hand and to the wind deflector carrier on the other hand. When displacing or actuating the releasing links, respectively, an automatic actuation of the horizontal function element is carried out, meaning when displacing the wind deflector carrier from the lowered storage position to the elevated releasing position, the roller web of the horizontal function element is automatically unwound from the winding device in particular against the force of a winding spring and brought into its function position.

If the wind deflector arrangement alternatively or additionally comprises a vertical function element, the wind deflector carrier receives a displacing mechanism for the vertical function element in a preferred embodiment of the invention.

The displacing mechanism, for example, comprises a releasing bracket for the vertical function element comprising a transverse leg, to which an edge of the vertical function element is fastened, and two releasing arms, whose ends facing away from the transverse leg are each movably mounted to the wind deflector carrier in the longitudinal direction of the vehicle.

In order to be able to keep the vertical function element in position, a supporting link is to be articulated to each of the releasing arms in a preferred embodiment, said supporting link being articulated to the wind deflector carrier with its end facing away from the corresponding releasing arm.

In a specific embodiment, the supporting links are each driven by means of a displacing motor. The displacing motor can be received by the wind deflector carrier and can in particular drive a worm gear comprising a gear connected to the corresponding supporting link in a torque-proof manner. However, it is also conceivable to drive the supporting links arranged on both sides of the vehicle by a common displacing motor.

In an alternative embodiment, the releasing arms are each mounted to a spindle nut for driving the vertical function element, said spindle nut being engaged with a threaded spindle driven by a corresponding displacing motor.

In order to be able to store objects preferably simply on the backbench when the horizontal function element is spanned, the wind deflector carrier comprises a loading link on each side which is connected to the corresponding second displacing link for actuating the horizontal function element, so that the first displacing link can be pivoted from the function position to the loading position when the releasing links are fixed.

The loading link and a coupling element formed at the wind deflector carrier preferably adopt a position above a dead center, defined by a stop, with respect to each other when in the function position. Thus, an unintended actuation of the loading assistance is avoided when actuating the releasing mechanism and when in the function position of the wind deflector arrangement.

In order to secure the position above the dead center and the loading position, the wind deflector arrangement can comprise a spring on each of its two sides which is connected to the corresponding loading link and the wind deflector carrier.

The loading link can comprise a guide track in which a corresponding guide pin of the wind deflector carrier is guided when displacing between the function position and the loading position. This increases the rigidity of the system.

Further advantages and advantageous embodiments of the subject matter of the invention can be taken from the description, the drawings and the claims.

BRIEF DESCRIPTIONS OF THE DRAWINGS

Two exemplary embodiments of a convertible vehicle according to the invention are shown in the drawings in a schematically simplified manner and are further described in the description. In the figures:

FIG. 31 shows a side view also corresponding to FIG. 29 of the wind deflector arrangement, but in its function position.

DETAILED DESCRIPTION

Figure 1:
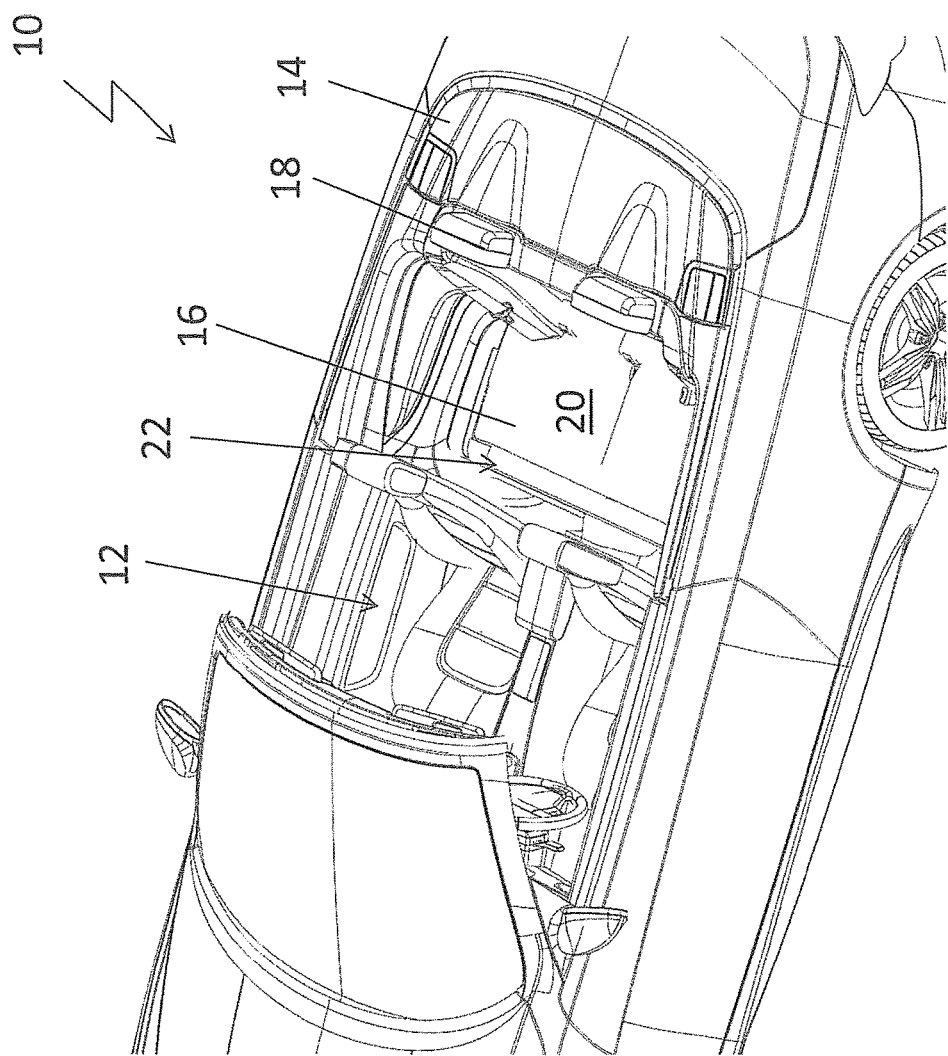
FIG. 1 shows a perspective top view of a convertible vehicle having a wind deflector arrangement in its storage position.
Figure 2:
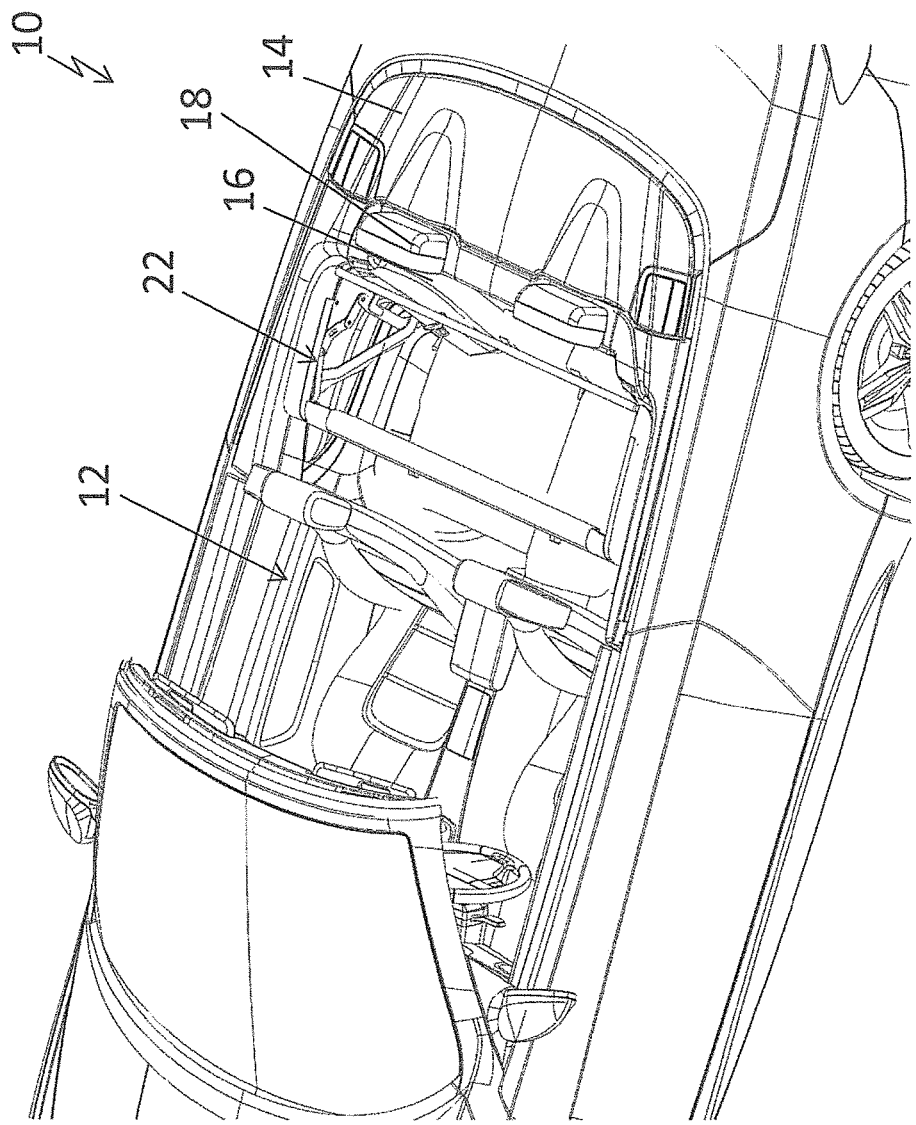
FIG. 2 shows a view corresponding to FIG. 1, but with the wind deflector arrangement in a first function position.
Figure 3:
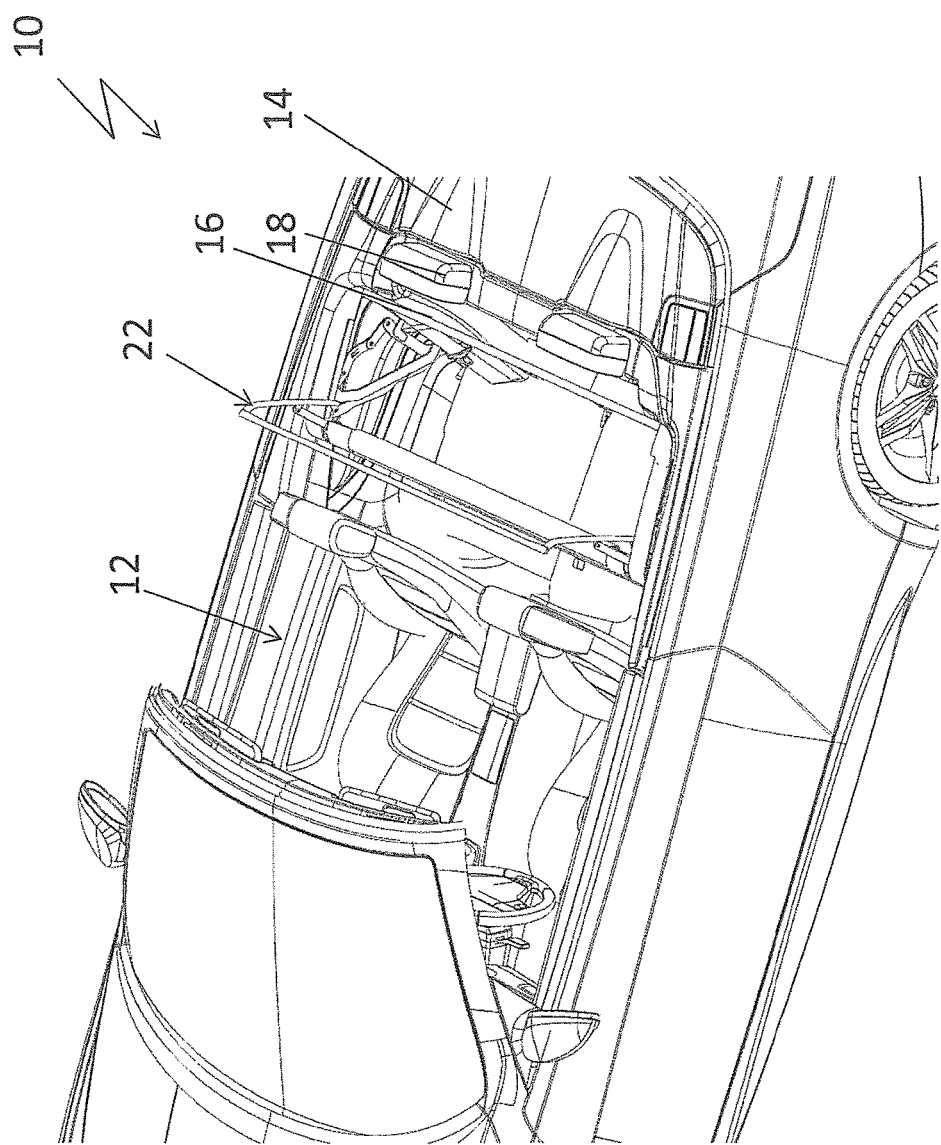
FIG. 3 shows a view also corresponding to FIG. 1, but with the wind deflector arrangement in a second function position.
Figure 4:
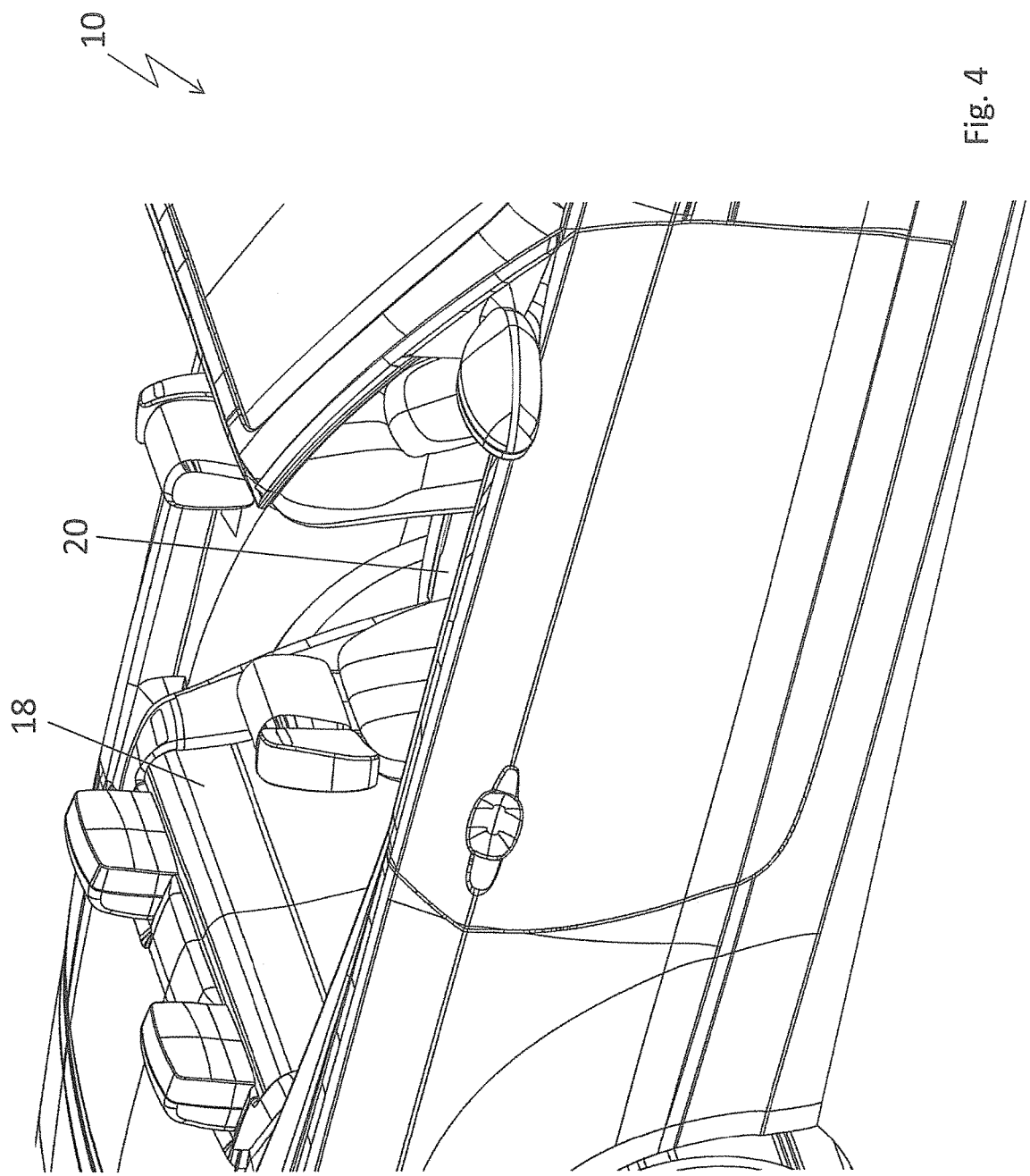
FIG. 4 shows another perspective view of the convertible vehicle in the storage position of the wind deflector arrangement.
Figure 5:
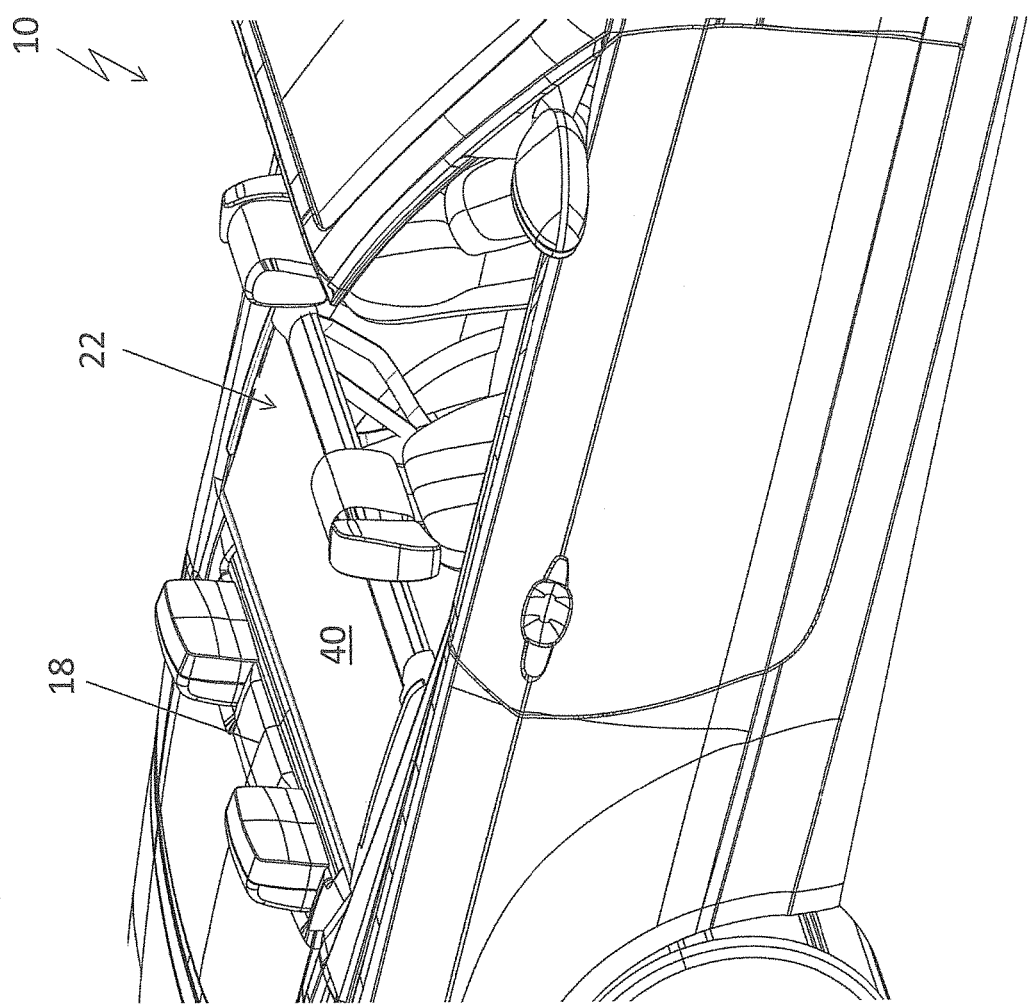
FIG. 5 shows a view corresponding to FIG. 4 of the convertible vehicle, but in the first function position.
Figure 6:
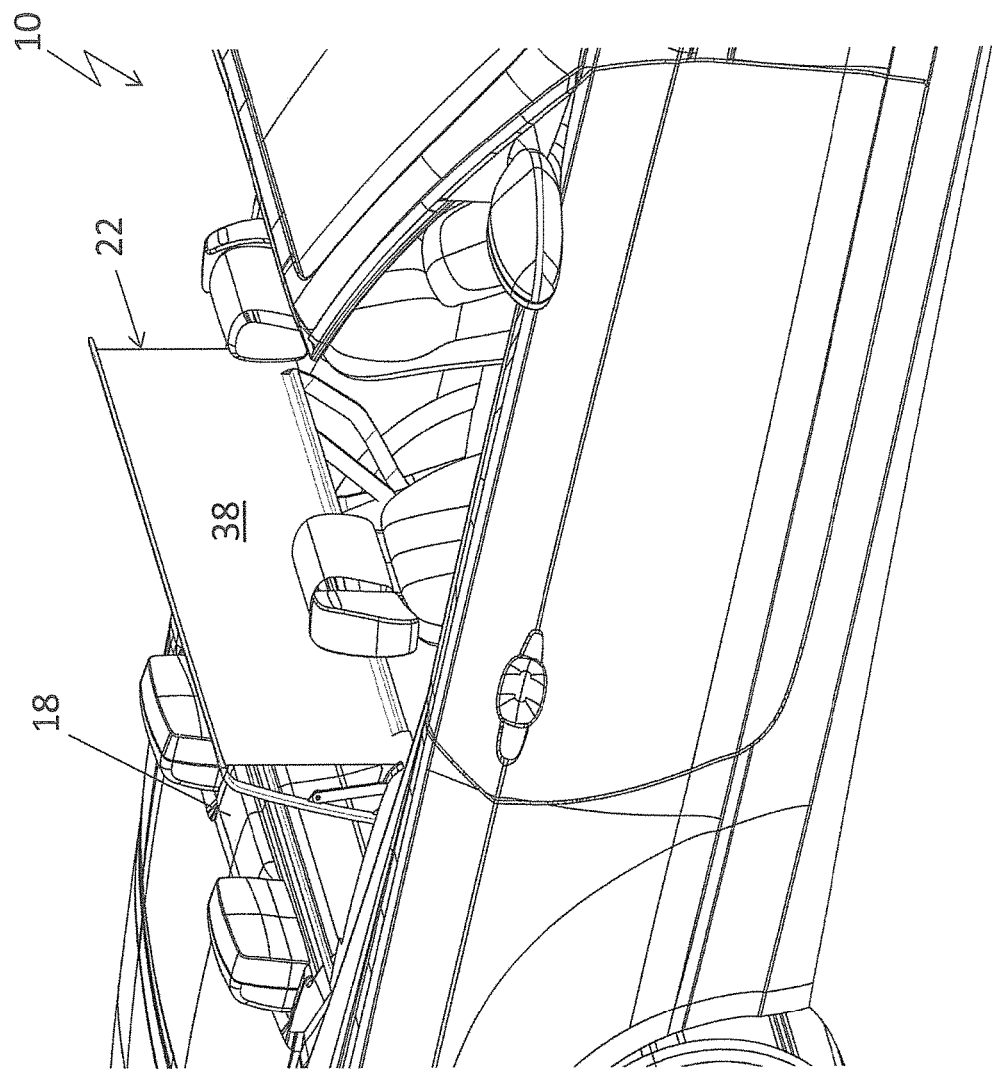
FIG. 6 shows a view corresponding to FIG. 4 of the convertible vehicle, but in the second function position of the wind deflector arrangement with an activated loading function.

The FIGS. 1 to 27 illustrate a convertible vehicle 10 provided with a folding top, not further illustrated, which can be displaced between a closing position spanning the vehicle interior 12 and a storage position releasing the vehicle interior 12 upward in which it is received by a top storage compartment at the back of the vehicle, said top storage compartment being able to be closed by means of a top storage compartment panel 14. The convertible vehicle is realized as a so-called four seater and comprises a backbench 16 besides the driver's seat and passenger seat, said backbench 16 being provided with a backrest 18 and a sitting area 20.

Figure 15:
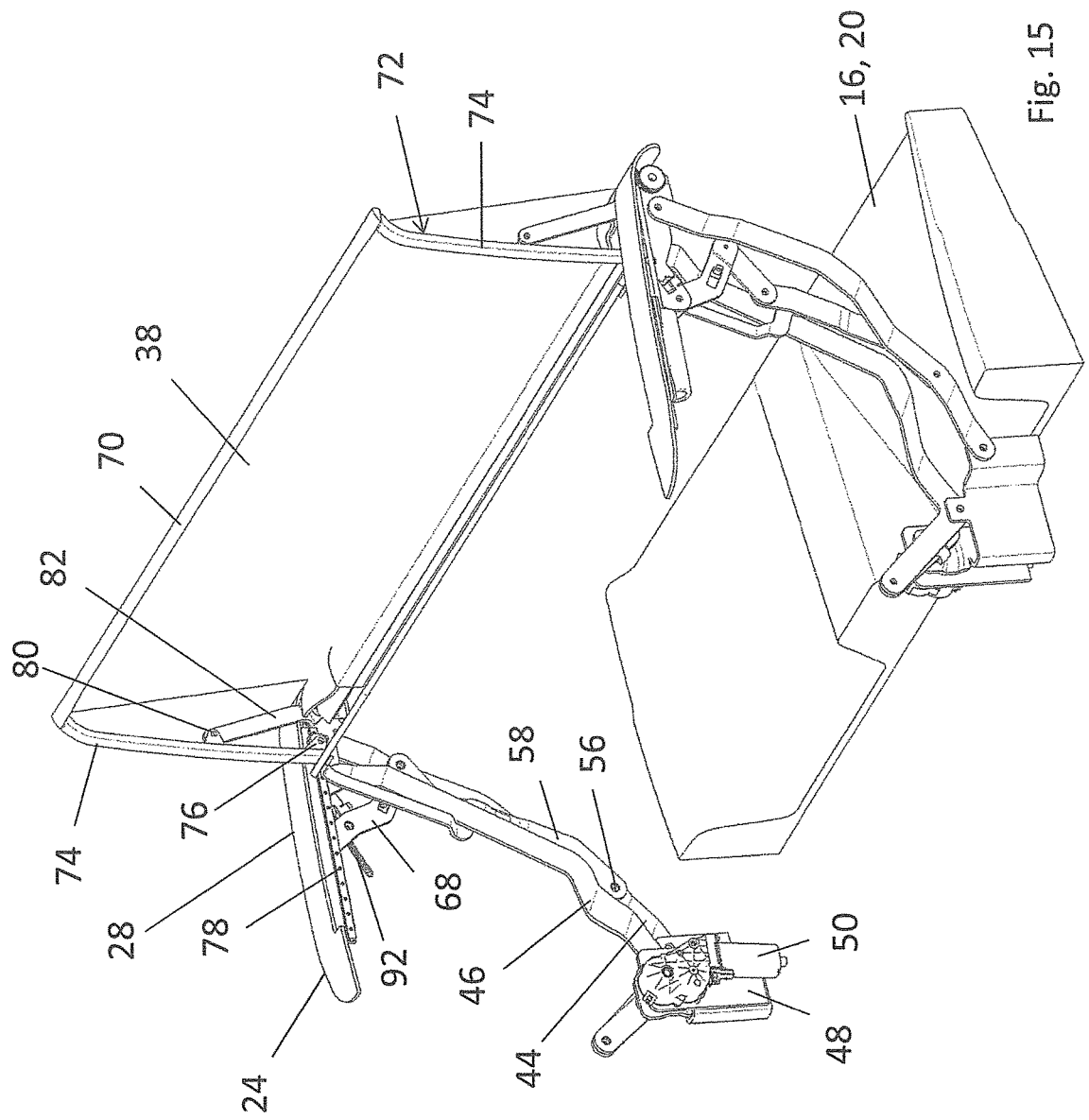
FIG. 15 shows a view corresponding FIG. 13 in the loading position of the wind deflector arrangement.
Figure 16:
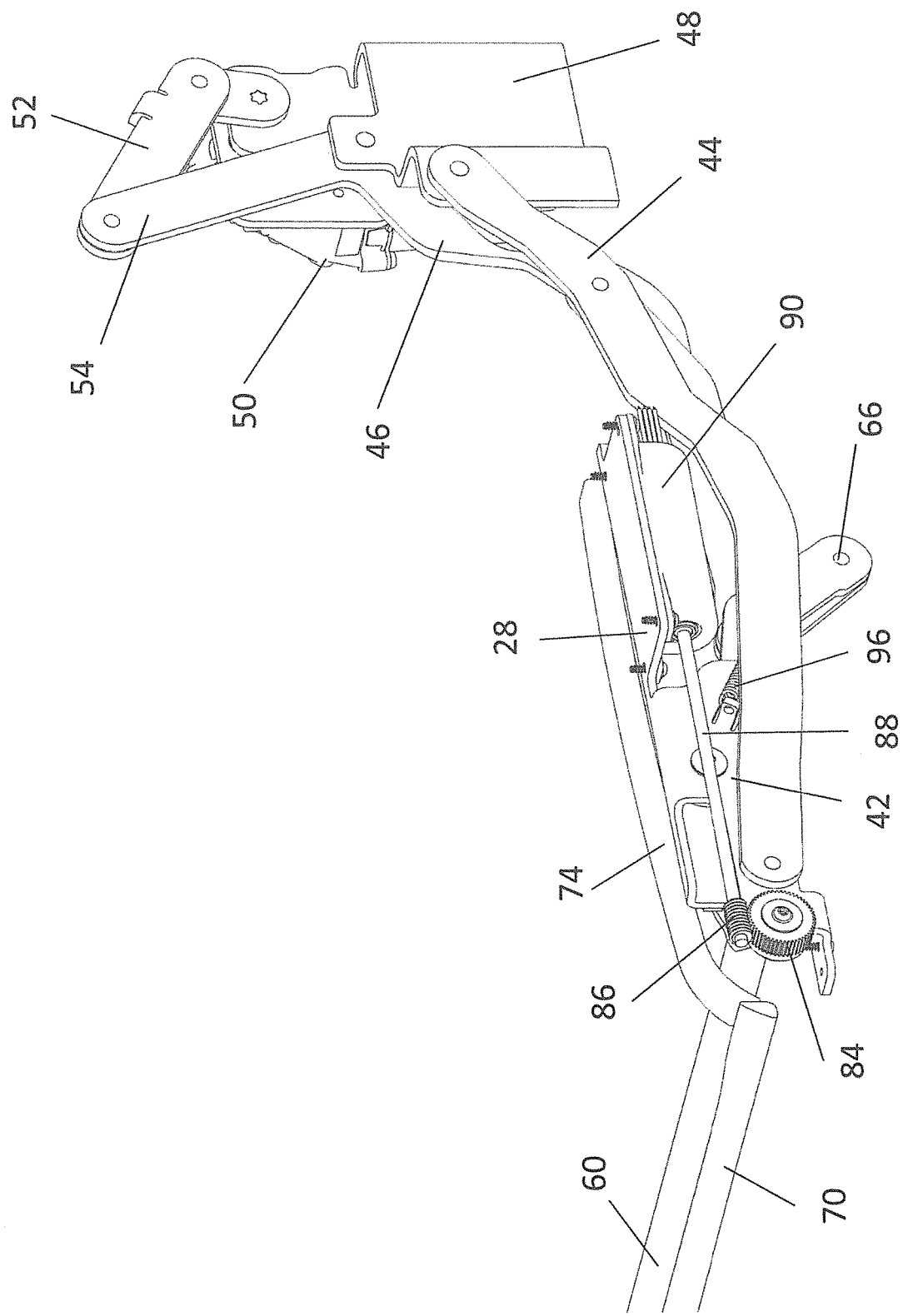
FIG. 16 shows an enlarged view of a link arrangement of the wind deflector arrangement in its storage position.
Figure 17:
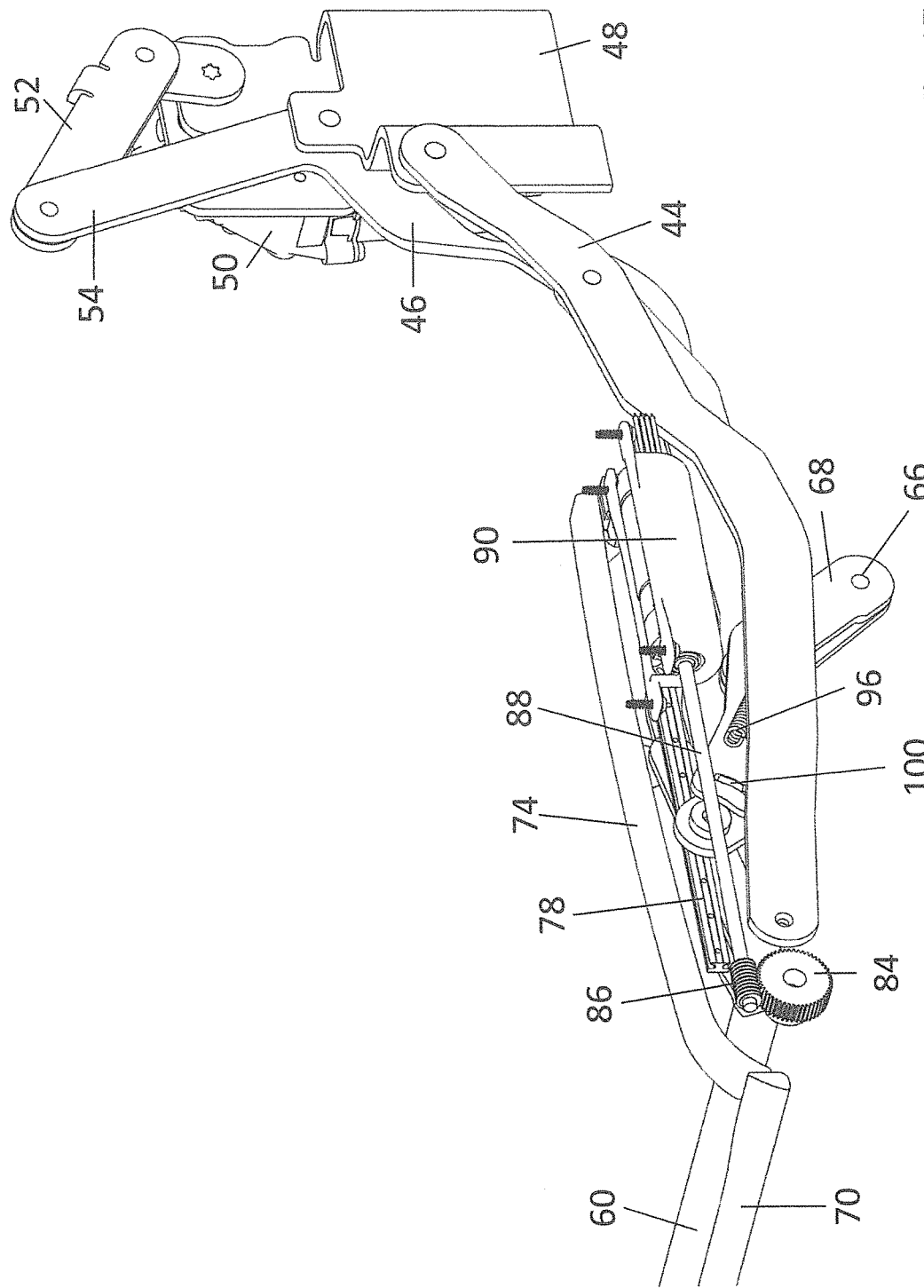
FIG. 17 shows a view corresponding to FIG. 16, but without a lateral coupling element of a wind deflector carrier.
Figure 18:
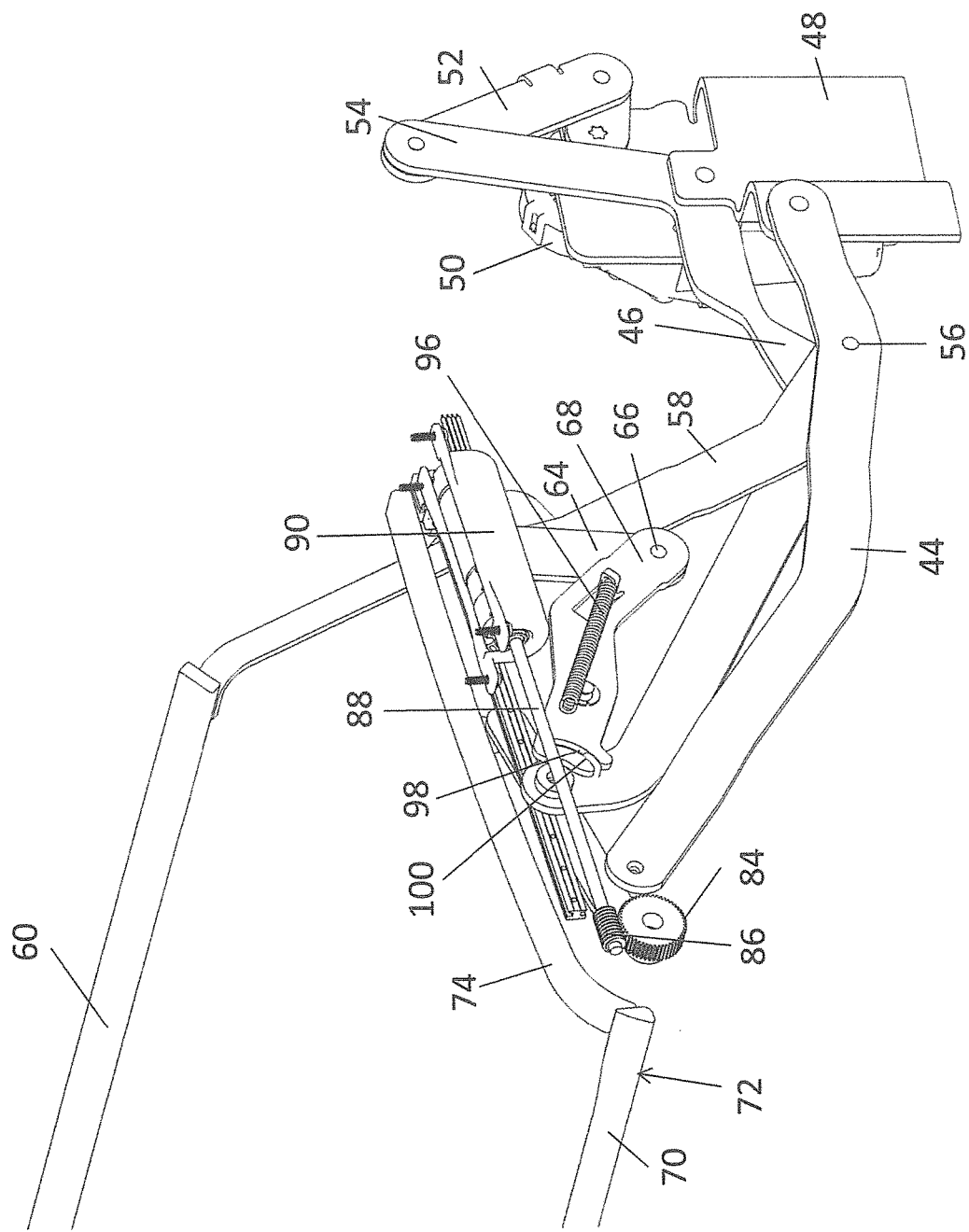
FIG. 18 shows a view corresponding to FIG. 17 of the wind deflector arrangement, but in an intermediary position when releasing the wind deflector carrier.
Figure 19:
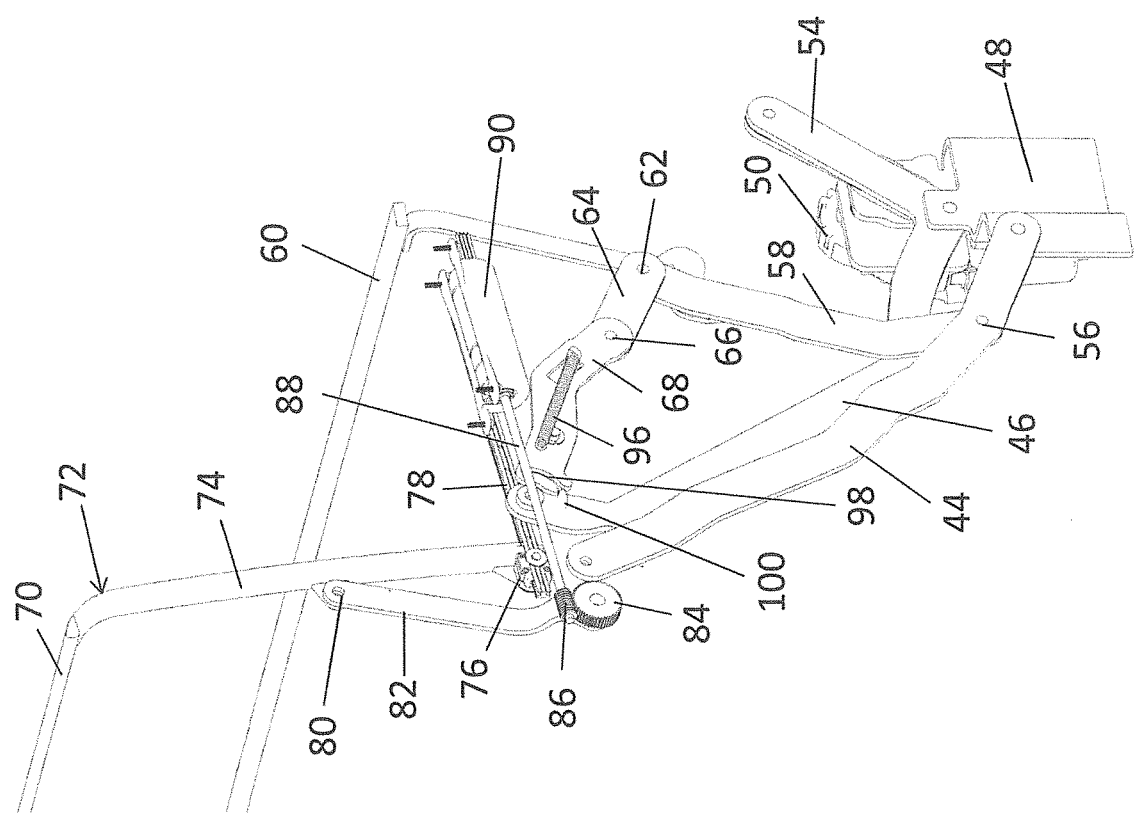
FIG. 19 shows a view corresponding to FIG. 18, but the wind deflector carrier is released and in the second position.
Figure 20:
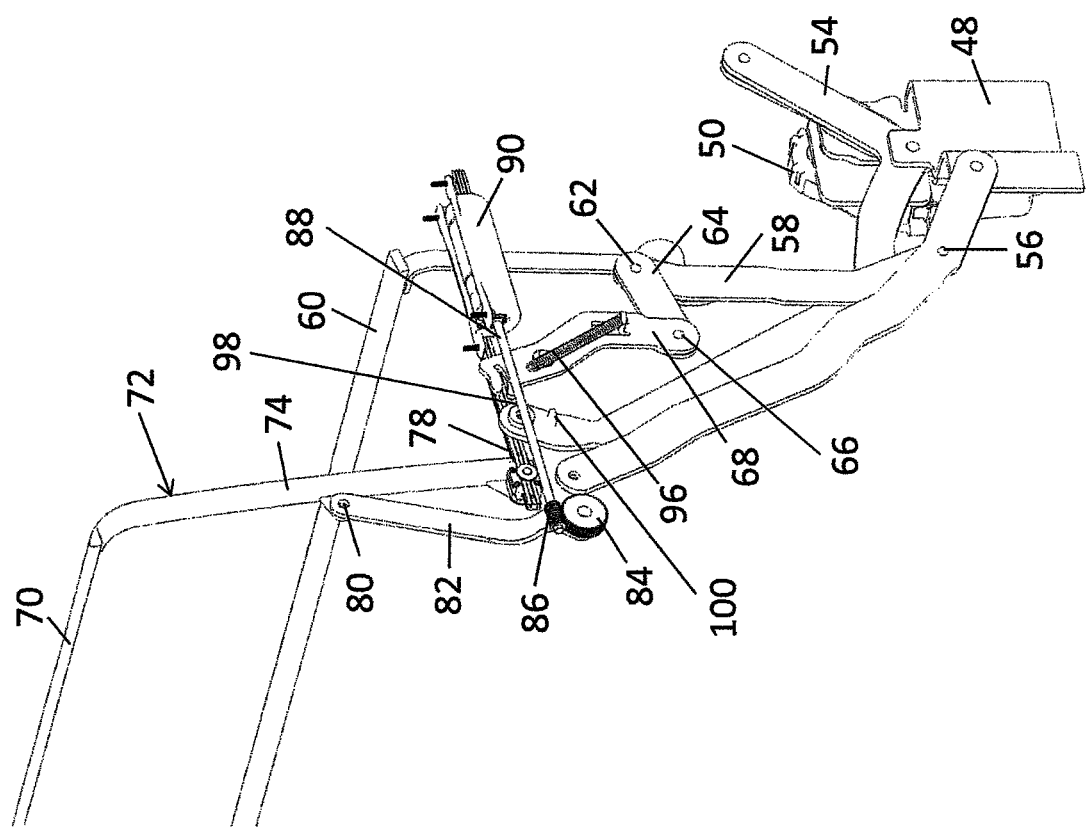
FIG. 20 shows a view corresponding to FIG. 19 of the wind deflector carrier when displaced in a loading position.
Figure 21:
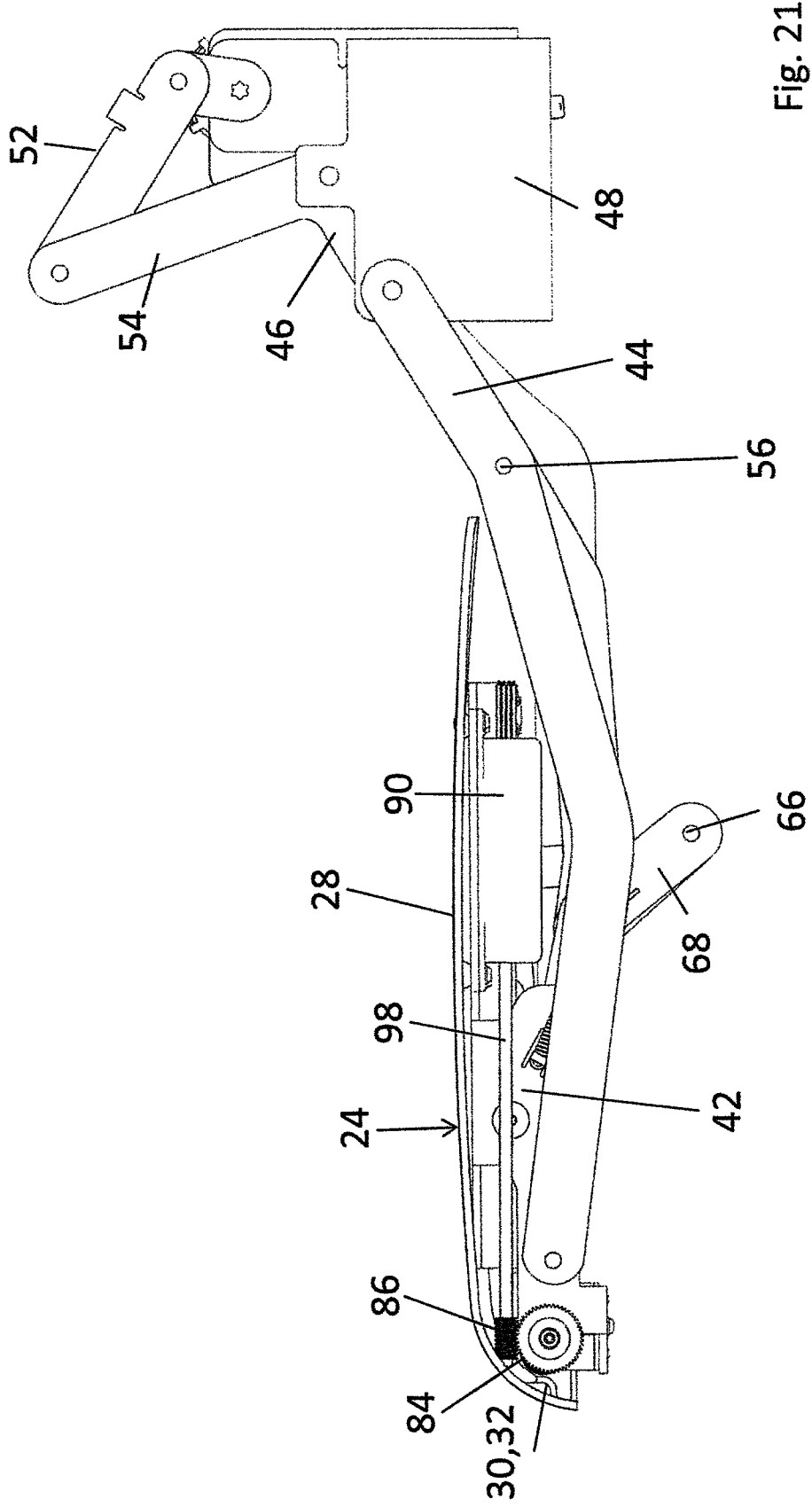
FIG. 21 shows a side view of the wind deflector arrangement in its storage position.
Figure 22:
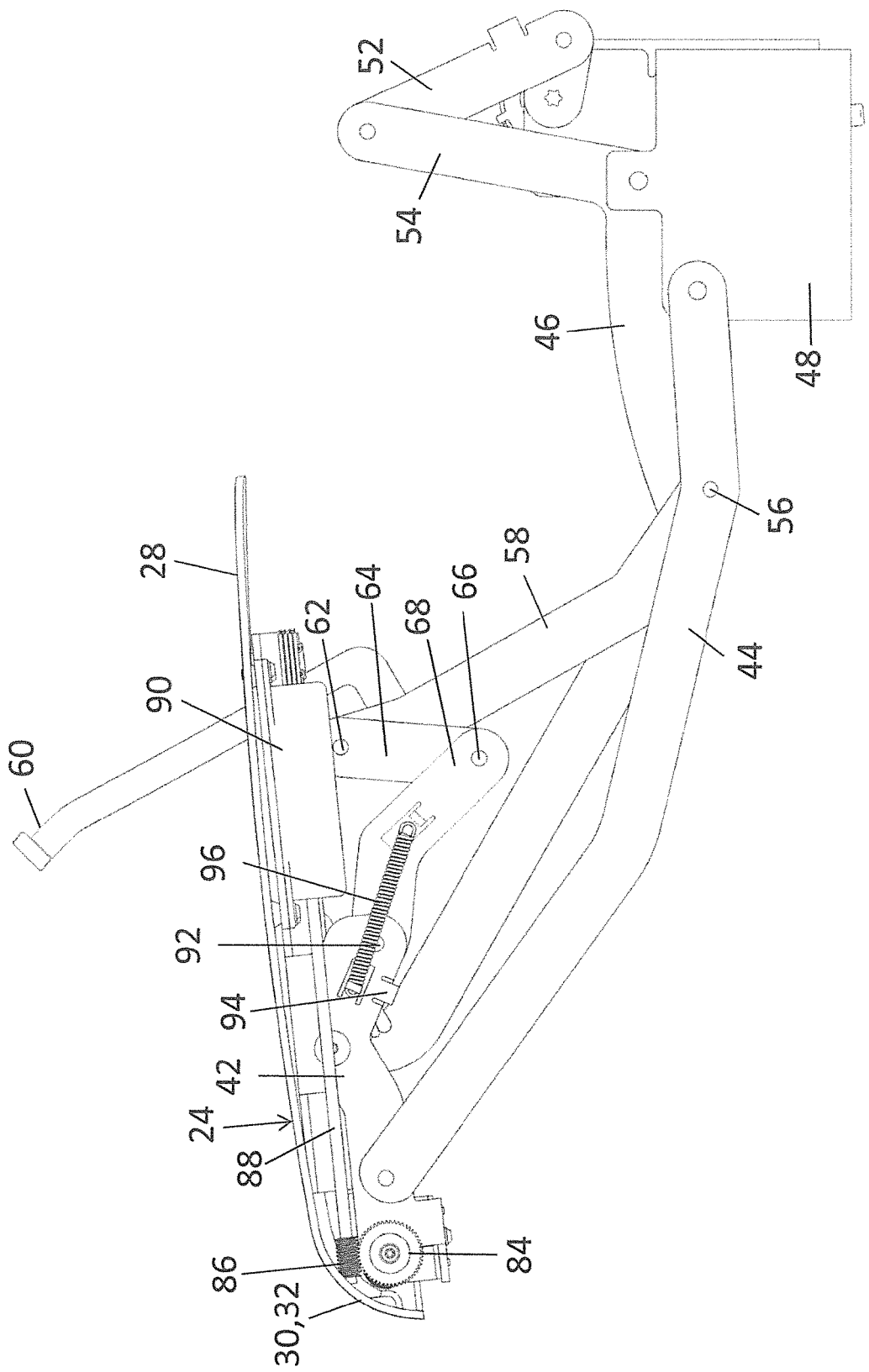
FIG. 22 shows a view corresponding to FIG. 21 when the wind deflector carrier is displaced into the first function position.
Figure 23:
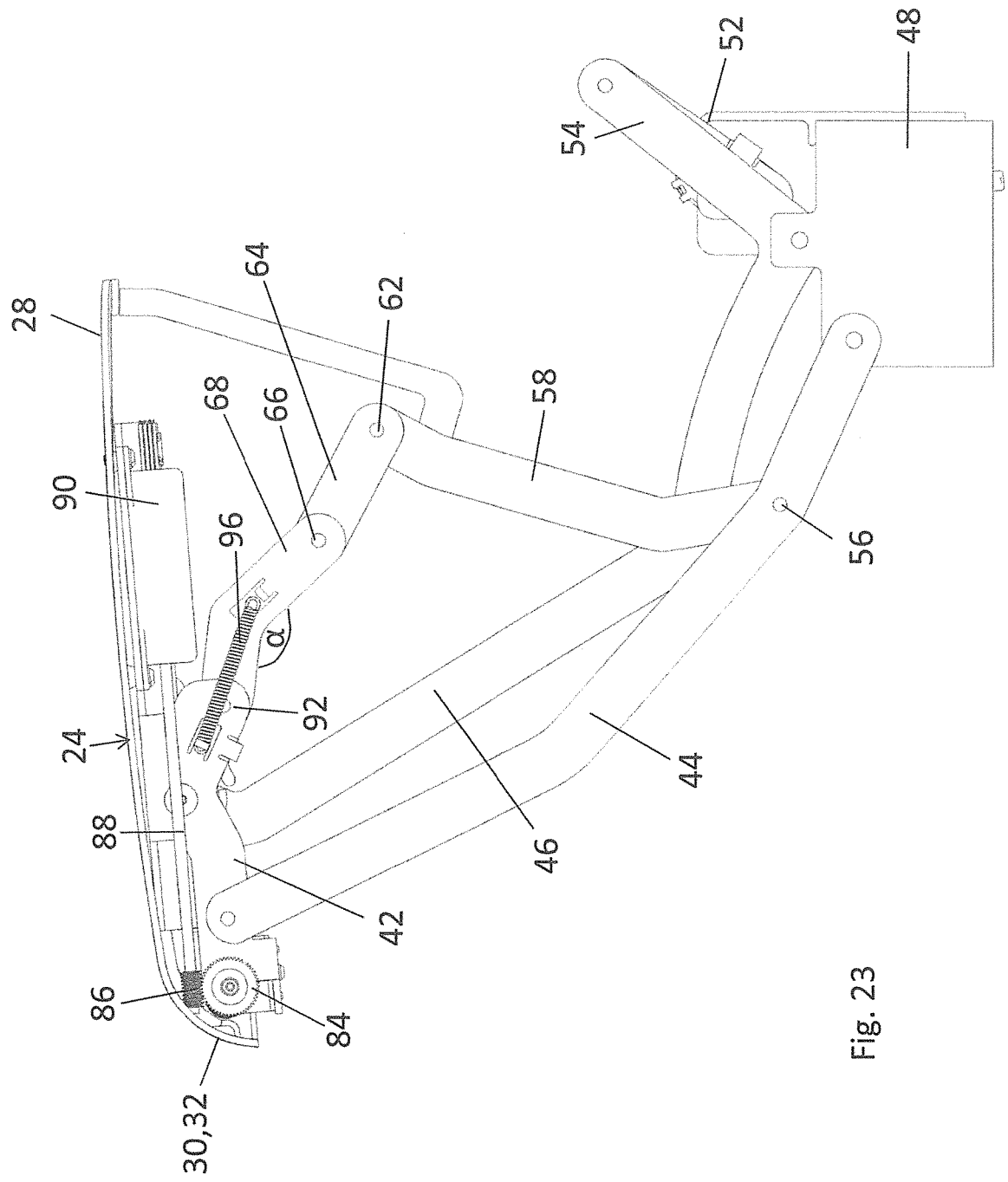
FIG. 23 shows a view corresponding to FIG. 21 of the wind deflector carrier in its first function position.
Figure 24:
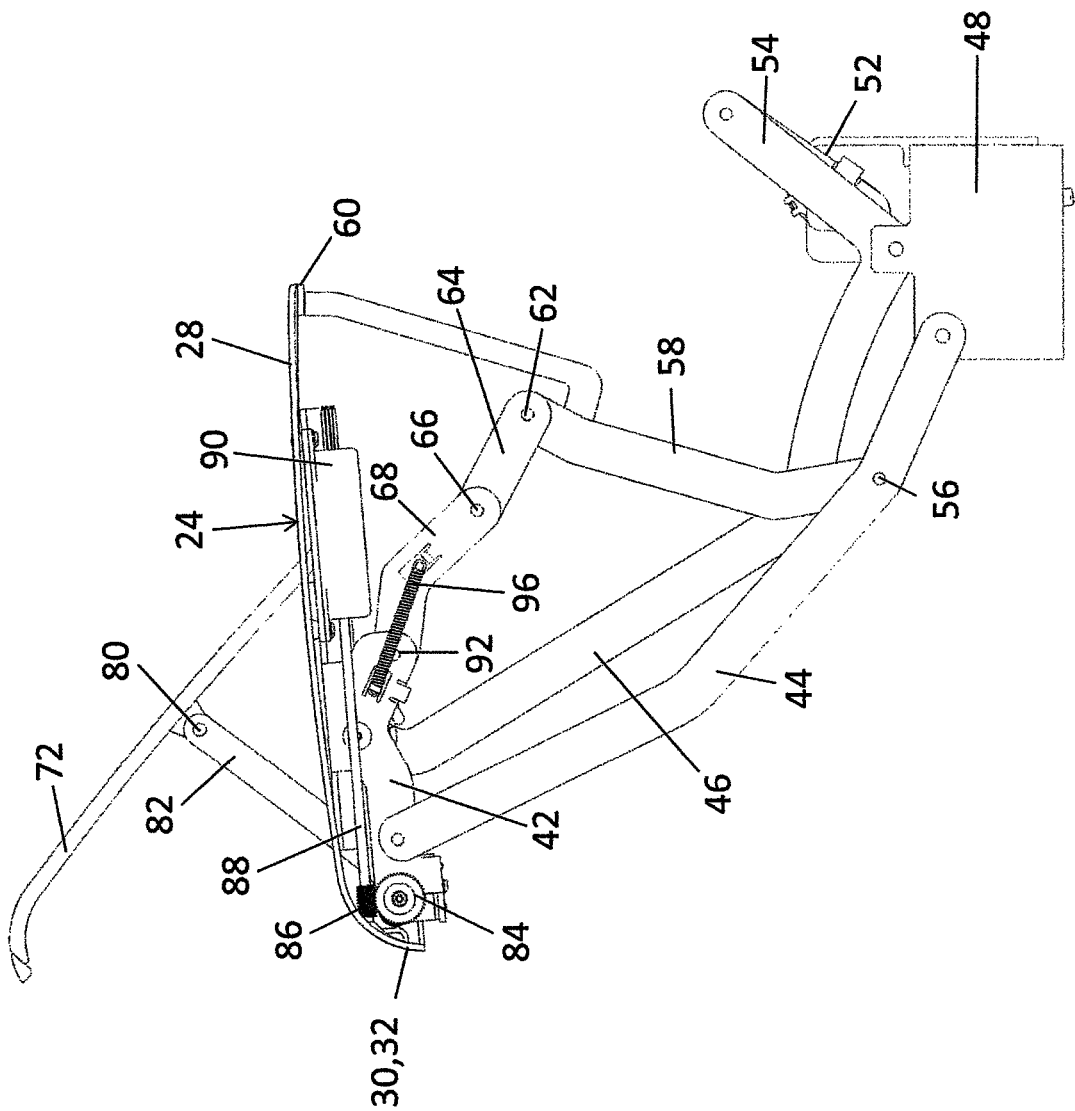
FIG. 24 shows a view also corresponding to FIG. 21 of the wind deflector arrangement when displaced in the second function position.
Figure 25:
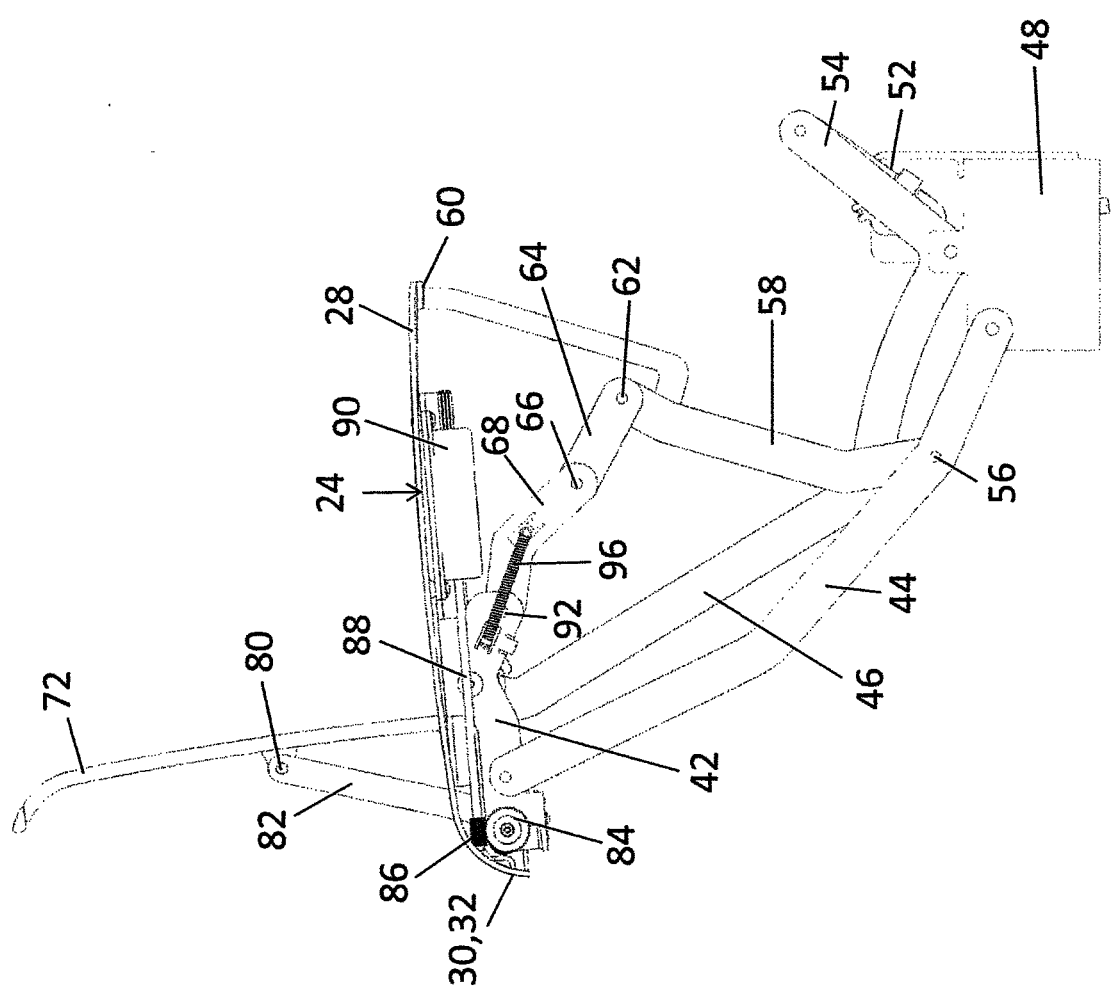
FIG. 25 show a view also corresponding to FIG. 21 of the wind deflector arrangement, but in its second function position.
Figure 26:
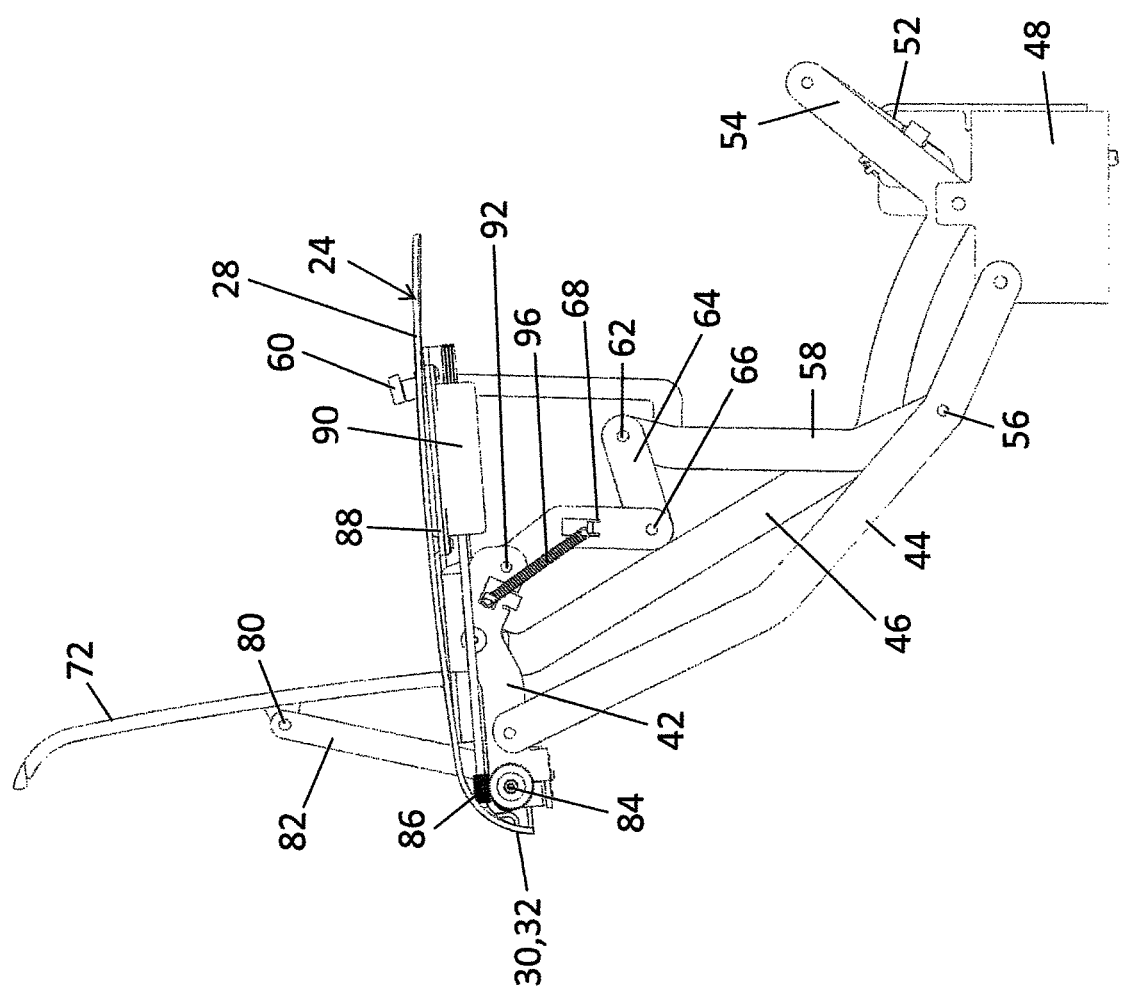
FIG. 26 shows a side view corresponding to FIG. 25 of the wind deflector arrangement when being displaced from the second function position to the loading position.

In order to minimize any bothersome air drafts or turbulences in the vehicle interior 12 when the folding top is open while driving, the convertible vehicle 10 comprises a wind deflector arrangement 22 behind the driver's seat and the passenger seat and extending in the transverse direction of the vehicle, said wind deflector arrangement 22 being able to be displaced between a lowered storage position (FIG. 7), a first function position (FIG. 8), a second function position (FIG. 9) and a loading position (FIG. 15).

The wind deflector arrangement 22 comprises a wind deflector carrier 24 which forms a wind deflector frame 26 which in turn forms an upper blind of the wind deflector arrangement 22 and is fitted to the shape of the backbench 16 regarding its shape. In the lowered storage position of the wind deflector arrangement 22, the wind deflector frame 26 laterally bounds the backbench 16 with its frame legs 28 arranged on both sides regarding a vertical longitudinal center plane of the vehicle and extending in the longitudinal direction of the vehicle as well as bounds the sitting area 20 of the backbench 16 at the frontal, forward-facing corner area with its frame leg 30 connecting the two frame legs 28 with each other and extending in the transverse direction of the vehicle. The frame leg 30 can comprise padding on its outer side for increasing the sitting comfort of the passengers in the back of the convertible vehicle 10.

The frame leg 30 forms a wind deflector casing 32 which receives two winding shafts 34 and 36, each realized as a winding device, for a roller web 38 and 40, respectively. The drive shafts 34 and 36, illustrated in FIG. 10 by dashed lines, are each pretensioned in the winding direction of the corresponding roller webs 38 and 40, respectively, by means of a winding spring, so that the corresponding roller webs 38 and 40, respectively, automatically wind themselves up onto the corresponding winding shaft 34 and 36, respectively, when in a released state. The roller web 40 is a horizontal function element of the wind deflector arrangement 22 spanning an essentially horizontal function plane in its function position (cf FIG. 11). The roller web 38 is a vertical function element of the wind deflector arrangement 22 spanning a vertical function plane extending in the transverse direction of the vehicle (cf. FIG. 12).

In the area of each frame leg 30, the wind deflector carrier 24 comprises a coupling element 42 to which two releasing links 44 and 46 are articulated via corresponding points of articulation, said releasing links 44 and 46 being parts of a releasing mechanism for the wind deflector carrier 24 and being articulated pivotably to a corresponding main bearing 48 mounted permanently to the vehicle with their ends facing away from the coupling element 42. A drive motor 50 formed as an electric motor is fastened to the main bearings 48, said drive motor 50 driving a protrusion 54 of the releasing link 46 via a coupling link arrangement 52.

The releasing links 44 and 46 are parts of a releasing mechanism for the wind deflector carrier 24, said releasing links 44 and 46 being formed mirror symmetrically regarding a vertical longitudinal center plane of the vehicle, for which reason the wind deflector arrangement 22 is described in the following solely by way of the part of the releasing mechanism arranged on the left regarding the forward traveling direction of the corresponding vehicle so as to ensure a better overview. The part of the releasing mechanism arranged on the right regarding the forward traveling direction of the vehicle can be conceived correspondingly.

The releasing link 44 comprises a point of articulation 56 in a middle area between the main bearing 48 and the wind deflector carrier 24, a first displacing link 58 being articulated to said point of articulation 56 and being provided with a clamping bracket 60 at the end facing away from the point of articulation 56, said clamping bracket 60 extending in the transverse direction of the vehicle and connecting the first displacing links 58 arranged on both sides with each other. An edge of the roller web 40 facing away from the wind deflector casing 32 is fixed at the clamping bracket 60. Another point of articulation 62 is formed at the displacing link 58, a second displacing link 64 being connected to the first displacing link 58 via said point of articulation 62, said first displacing link 58 being connected to a loading link 68 via a point of articulation 66, said loading link 68 being attributed to the wind deflector carrier 24. The displacing links 58 and 64 form a clamping link arrangement for the roller web 40 or rather the horizontal function element which is coupled to the releasing mechanism for the wind deflector carrier 24.

The roller web 38 formed as a vertical function element is connected to a transverse leg 70 of a releasing bracket 72 at the roller web's 38 end facing away from the winding shaft 34, said releasing bracket 72 comprising a releasing arm 74 on each side regarding the vertical longitudinal center plane of the vehicle, the end of the releasing arm 74 facing away from the transverse leg being pivotably mounted to a slider 76. The slider 76 is movably guided in a guide track 78 extending in the longitudinal direction of the vehicle and being arranged at the wind deflector carrier 24 in the area of the corresponding frame leg 28. A supporting link 82 is articulated to the releasing arm 74 in a middle area via a point of articulation 80, said supporting link 82 being pivotably mounted to the wind deflector carrier 24 with its end facing away from the point of articulation 80 and carrying a gear 84 which engages with a worm 86 driven by a drive shaft 88 of a corresponding displacing motor 90. An actuation of the displacing motor 90 thus leads to a pivoting of the supporting link 82 and consequently to an elevation of the releasing clamp 72 guided movably in the guide track 78. The roller web 38 is thus unwound from its winding shaft 34 or wound up on the winding shaft 34 when putting the displacing motor 90 in reverse.

Moreover, the wind deflector arrangement 22 is equipped with a loading function which allows winding the roller web 40 onto the winding shaft 36 by manual quick actuation of the clamping bracket 60 thus unblocking access to the backbench 16, namely when the wind deflector carrier 24 is elevated or rather released.

The loading function of the wind deflector arrangement 22 is realized by the wind deflector carrier 24 comprising the loading link 68 on each side which is articulated to the coupling element 42 in a point of articulation 92. In the standard position, meaning when the loading function is not activated, the coupling element 42 and the loading link 68 adopt a position above the dead center with respect to each other, which is defined by means of a stop 94 formed at the coupling element 42. A coil spring 96 acting as a tension spring serves to secure the position of the coupling element 42 and the loading link 68 above the dead center, said coil spring 96 being hooked into the coupling element 42 on the one hand and into the loading link 68 on the other hand. The basic form of the loading link 68 is angular, wherein two main legs of the loading link span an obtuse angle α of approximately 140° to 160°.

The loading link 68 has a guiding slit 98 having an arc-shaped progression and an open end in its end area articulated to the coupling element 42. A guide pin 100 is guided in the guiding slit 98 and is formed at the releasing link 46.

The above-described wind deflector arrangement 22 works in the following manner.

Figure 7:
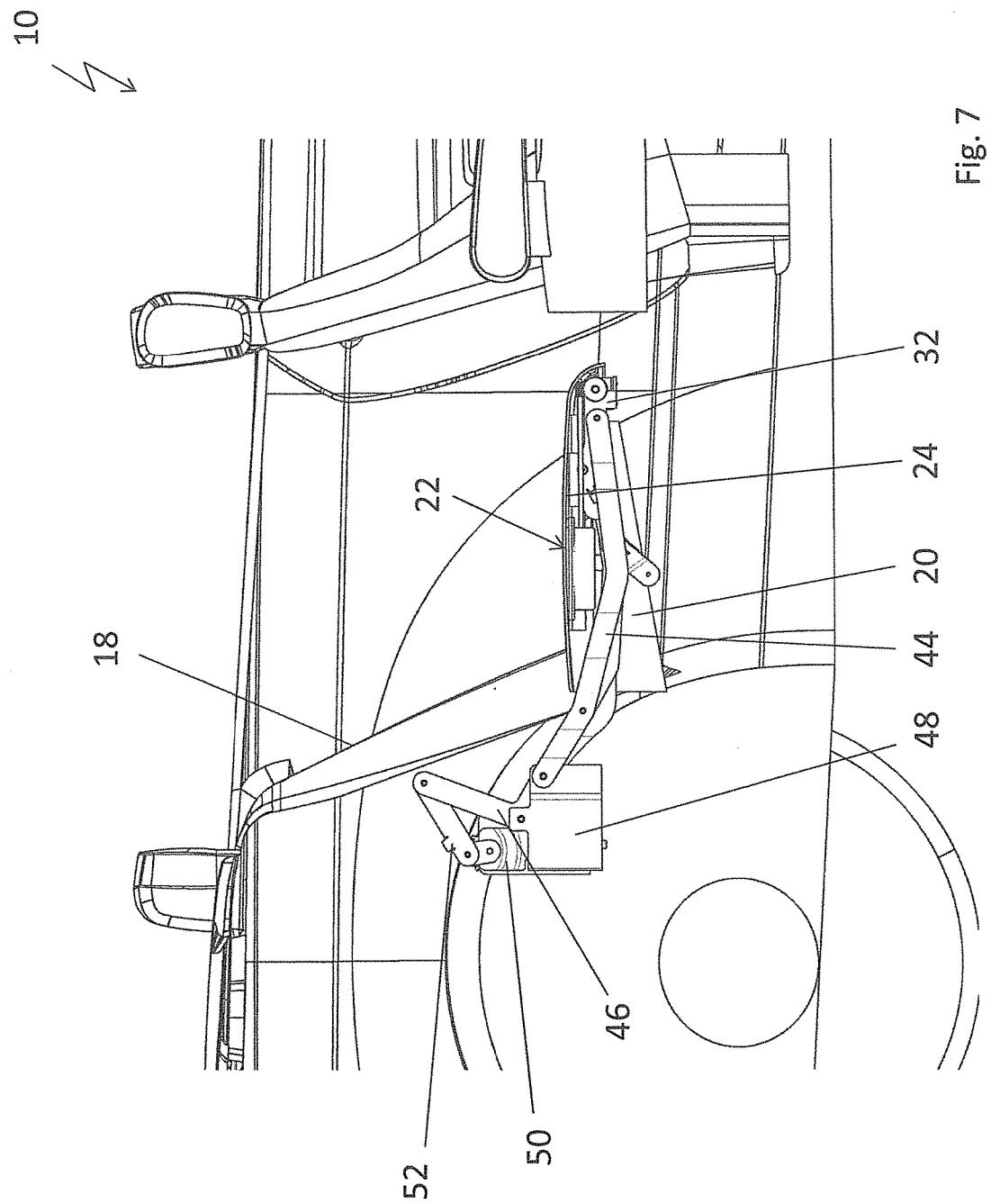
FIG. 7 shows a side view of the convertible vehicle without a lateral chassis in the storage position of the wind deflector arrangement.
Figure 8:
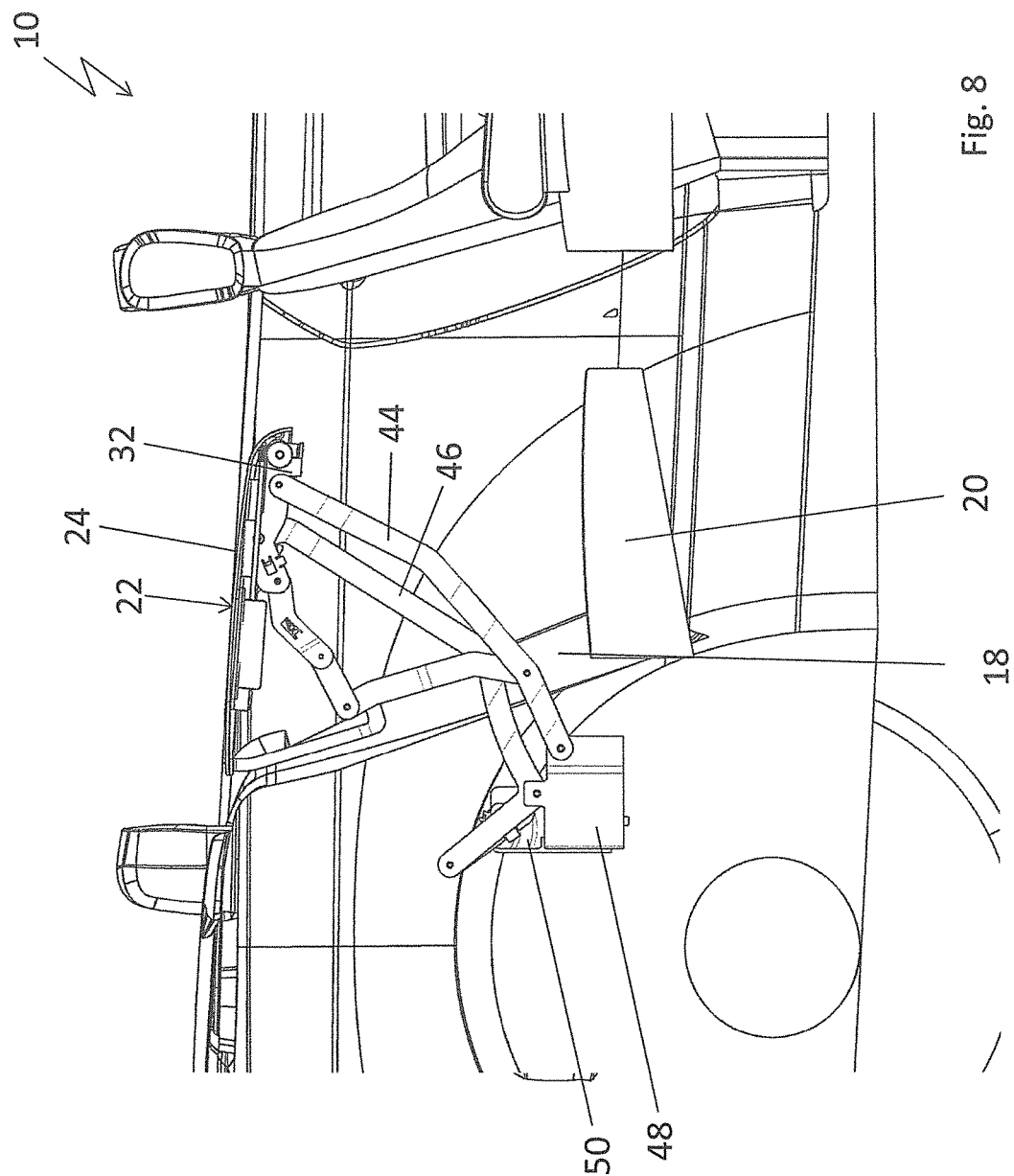
FIG. 8 shows a view corresponding to FIG. 7 of the convertible vehicle in the first function position of the wind deflector arrangement.
Figure 9:
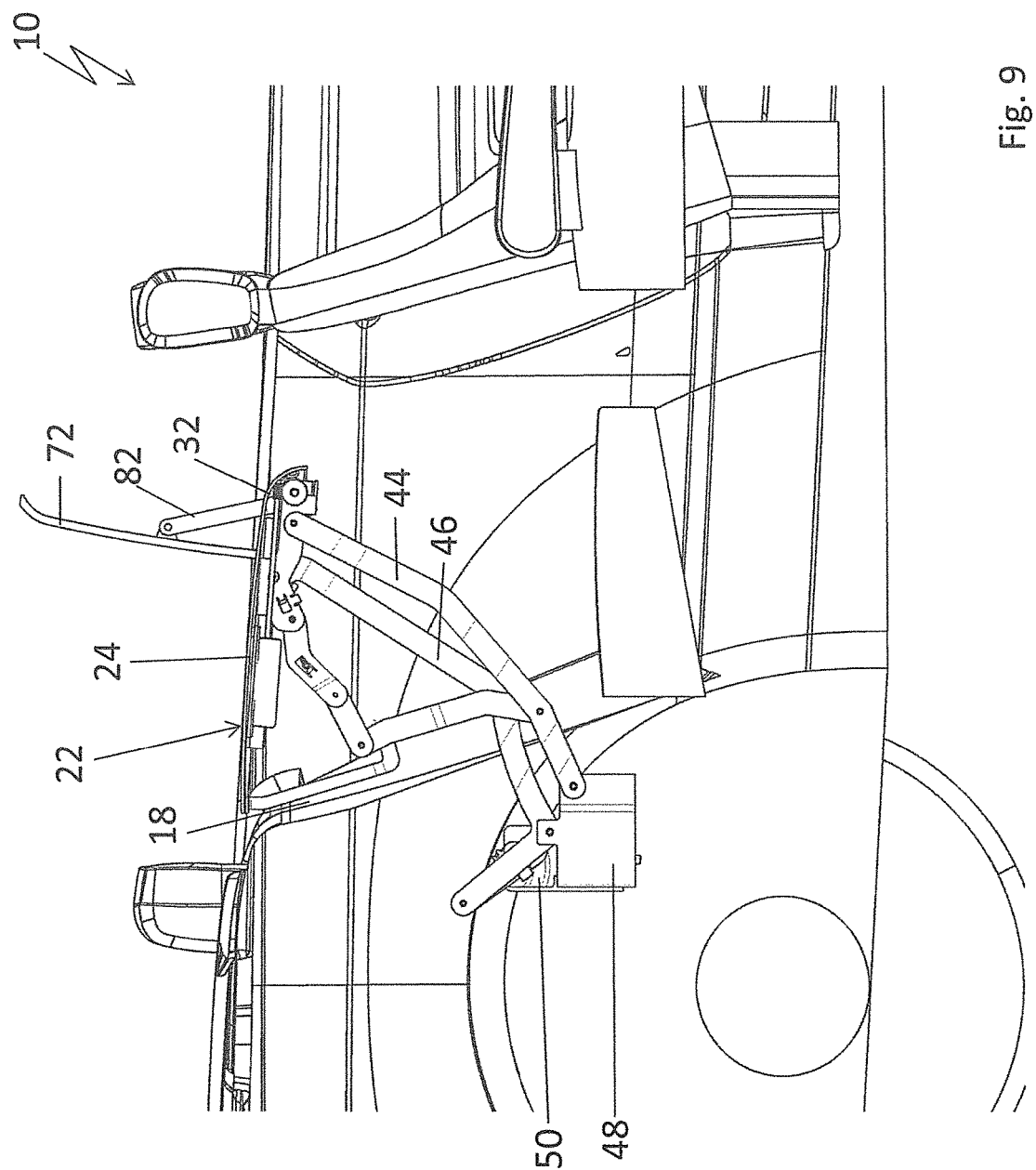
FIG. 9 shows a view corresponding to FIG. 7 of the convertible vehicle, but in the second function position of the wind deflector arrangement.
Figure 10:
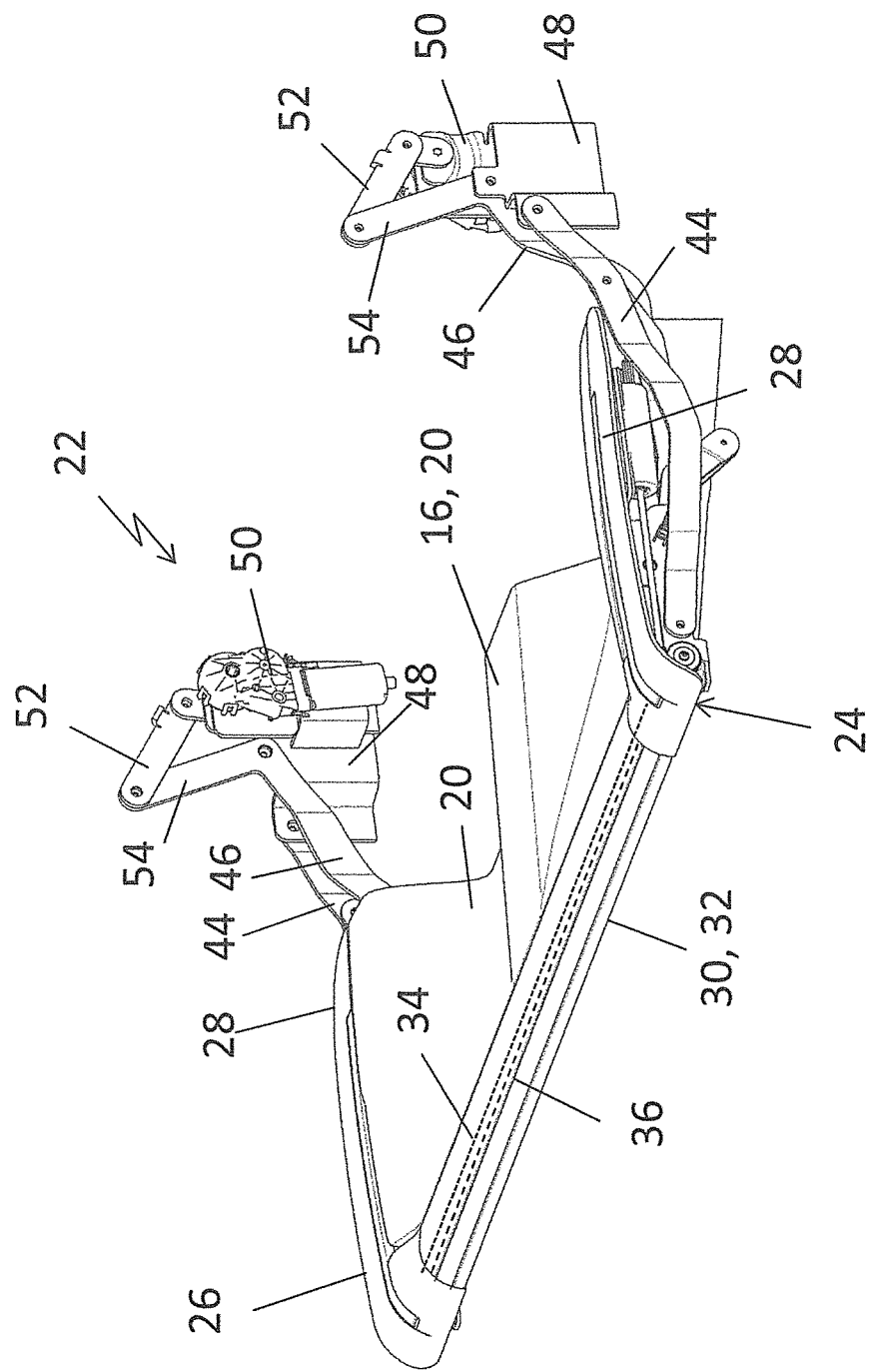
FIG. 10 shows a perspective view of a backbench of the convertible vehicle and the wind deflector arrangement in its storage position.
Figure 11:
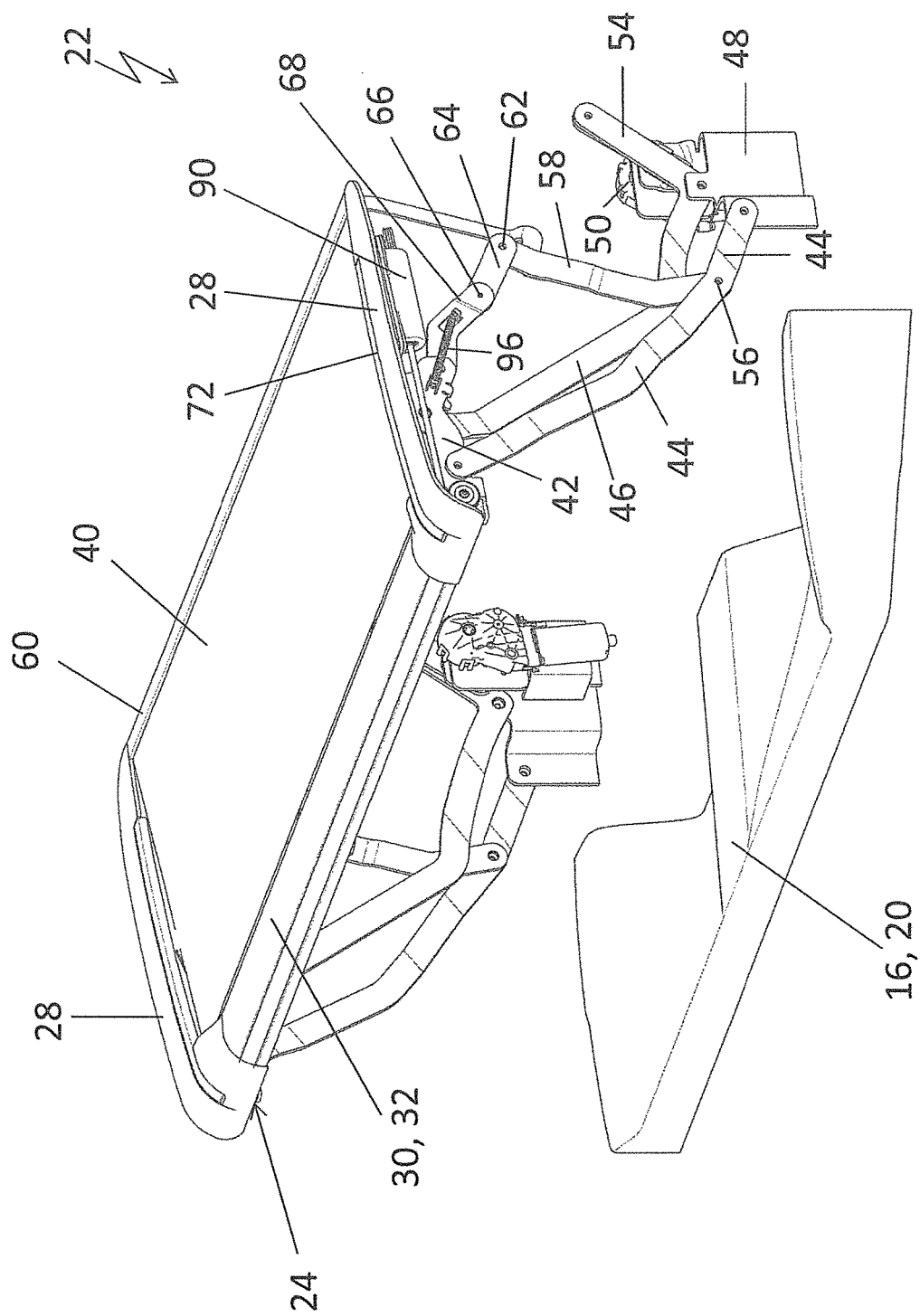
FIG. 11 shows a view corresponding to FIG. 10, but in the first function position of the wind deflector arrangement.
Figure 12:
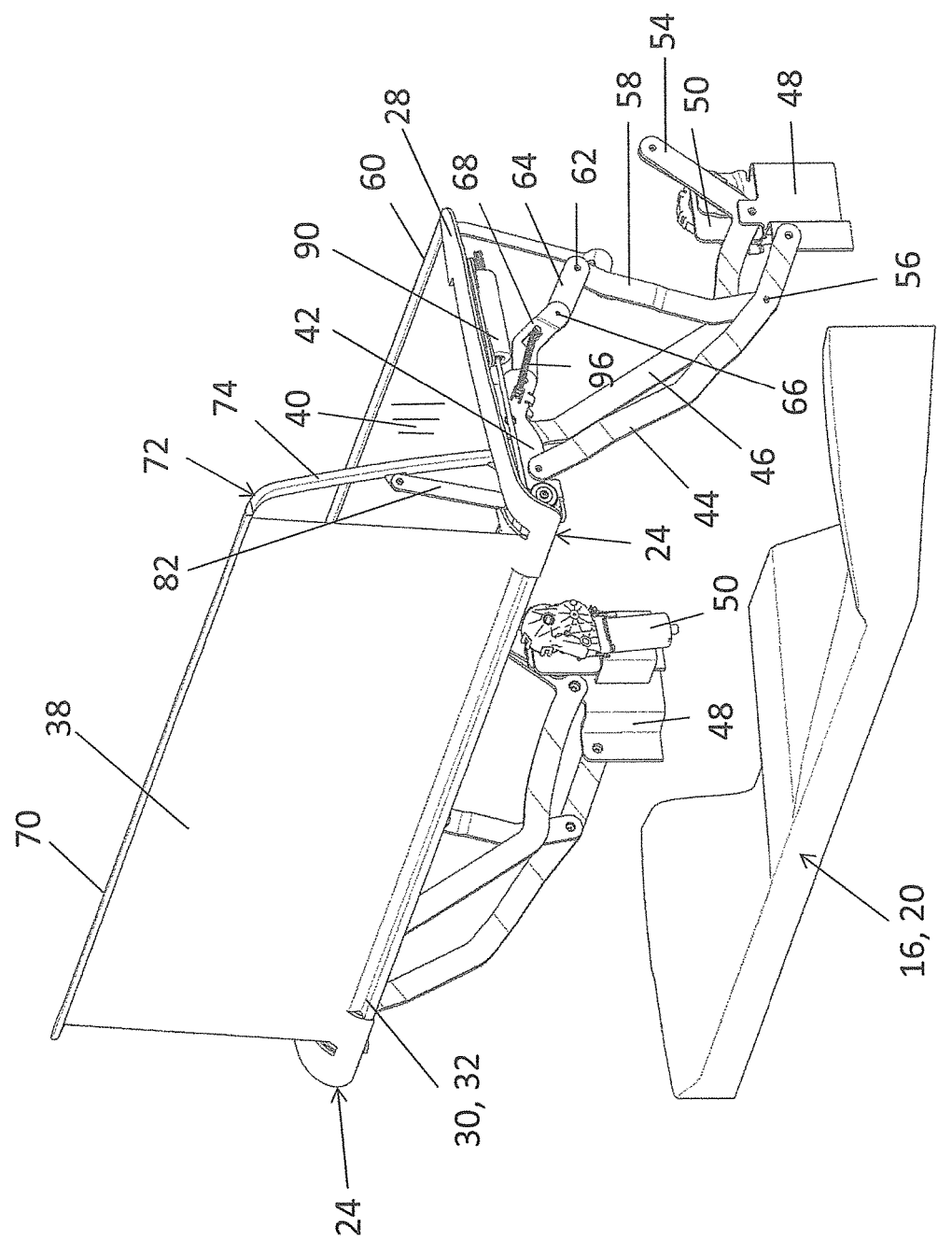
FIG. 12 shows a view also corresponding to FIG. 10, but in the second function position of the wind deflector arrangement.
Figure 13:
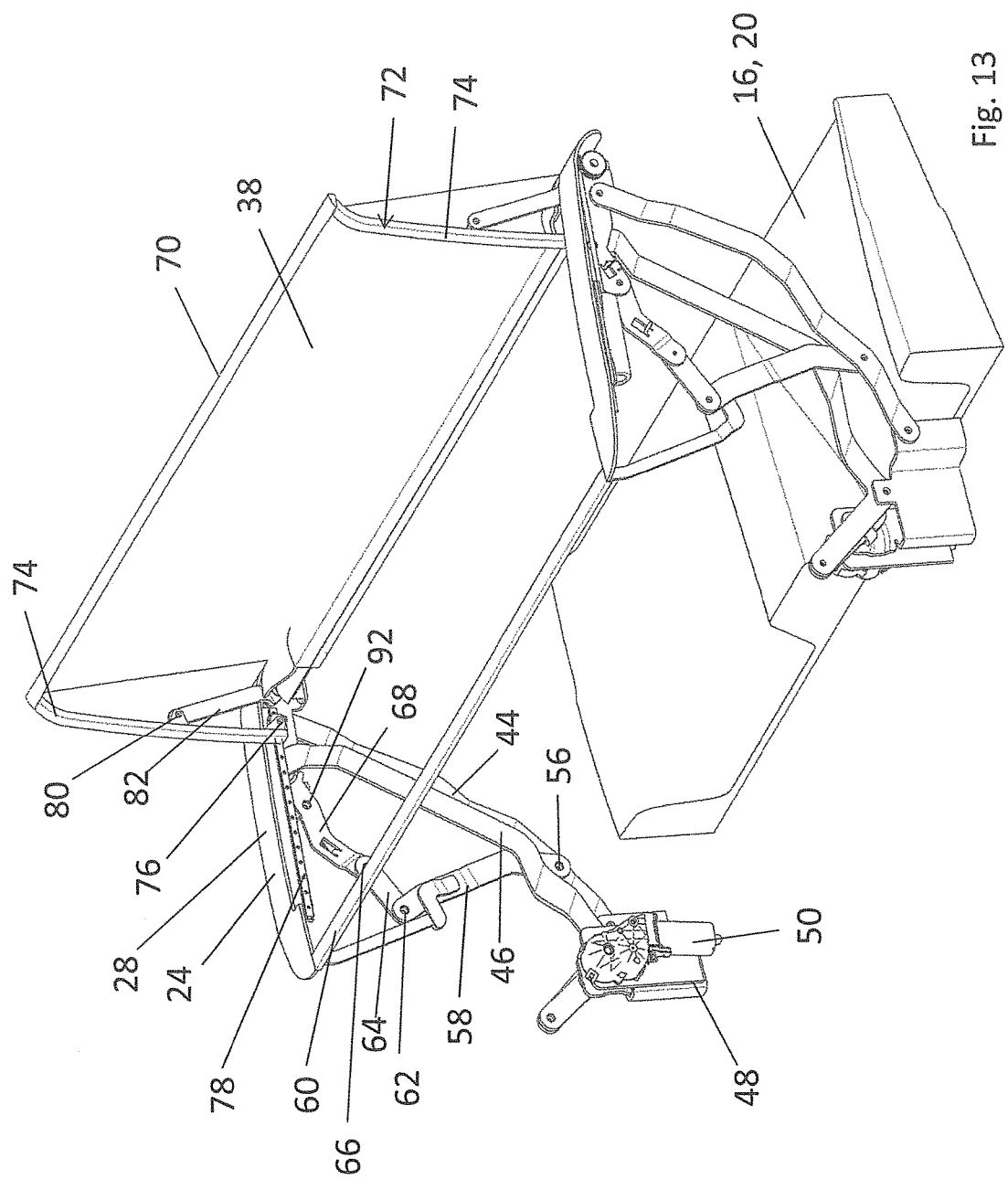
FIG. 13 shows another perspective view of the backbench and the wind deflector arrangement in the second function position.
Figure 14:
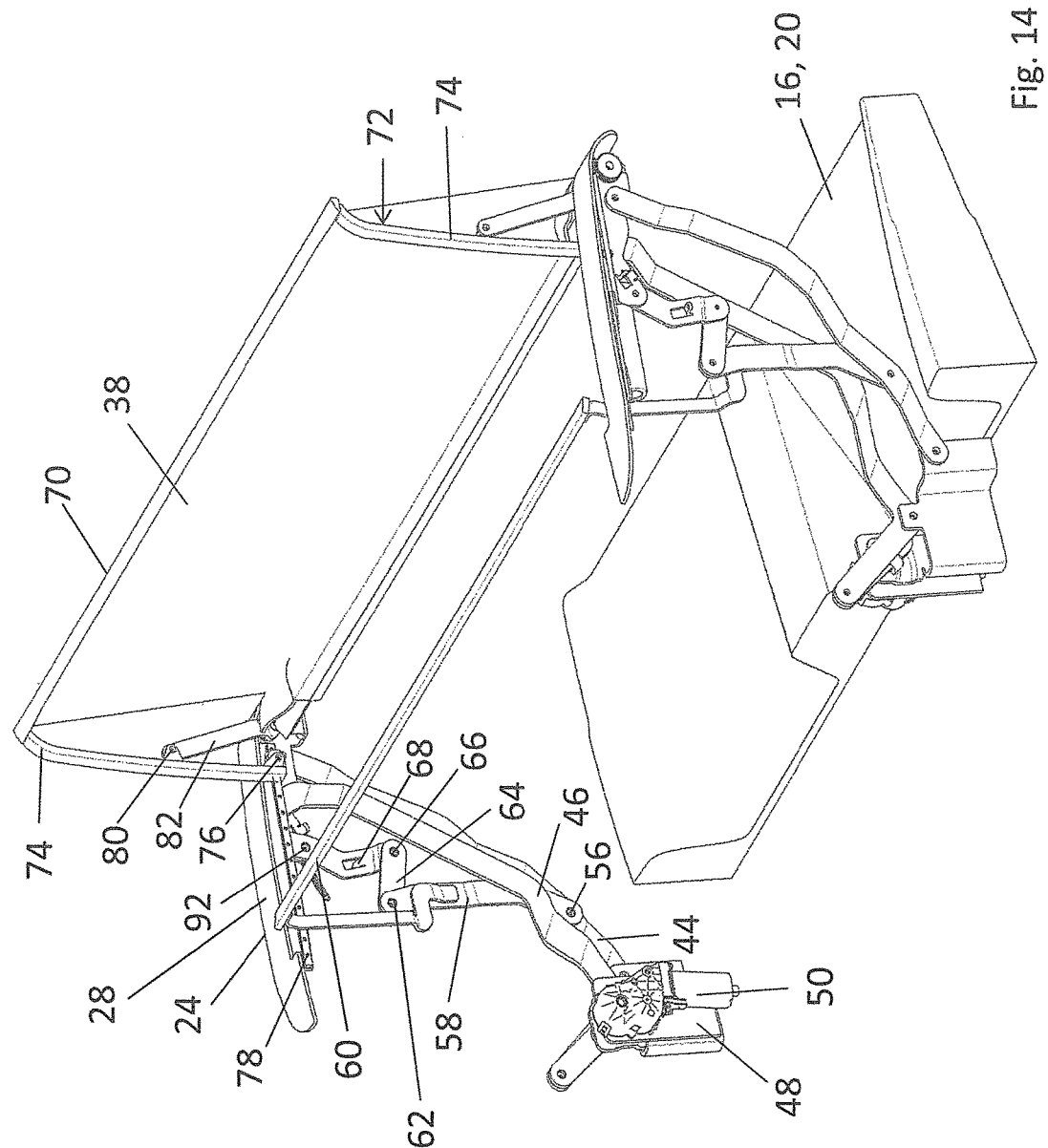
FIG. 14 shows a view corresponding to FIG. 13, but in an intermediary position when activating a loading function.

Starting from the storage position shown in FIG. 7, in which the frame leg 30 of the wind deflector carrier 24 forms a frontal corner area of the sitting area 20 of the backbench 16, the drive motors 50 arranged at the main bearings 48 on both sides are actuated simultaneously, causing the releasing links 44 and 46 to pivot and to carry out a lifting position at the elevated wind deflector carrier 24. Simultaneously, the displacing link 64 and the loading link 68 arranged at the wind deflector carrier 24 experience a stretching movement with respect to each other, in which case the displacing link 64, to which the clamping bracket 60 of the roller web 40 is tied, is pivoted away from the wind deflector casing 32 and the roller web 40 is unwound from its winding shaft 36 in order to form the horizontal function element. In the upper end position of the releasing links 44 and 46, the first function position of the wind deflector arrangement 22, illustrated in FIG. 23, for example, is realized, in which position only the horizontal function element is activated. The coupling element 42 and the loading link 68 take up the first position to each other above the dead center mentioned above, which almost corresponds to an extended position, in the lowered storage position and while being released.

In order to displace the wind deflector arrangement 22 in a second function position, in which the roller web 38 is also activated as a vertical function element, the displacing motors 90 arranged on both sides at the wind deflector carrier 24 are actuated, in which case the releasing bracket 72 is released by driving the supporting link 82 and the roller web 38 is unwound from its winding shaft 34.

Figure 27:
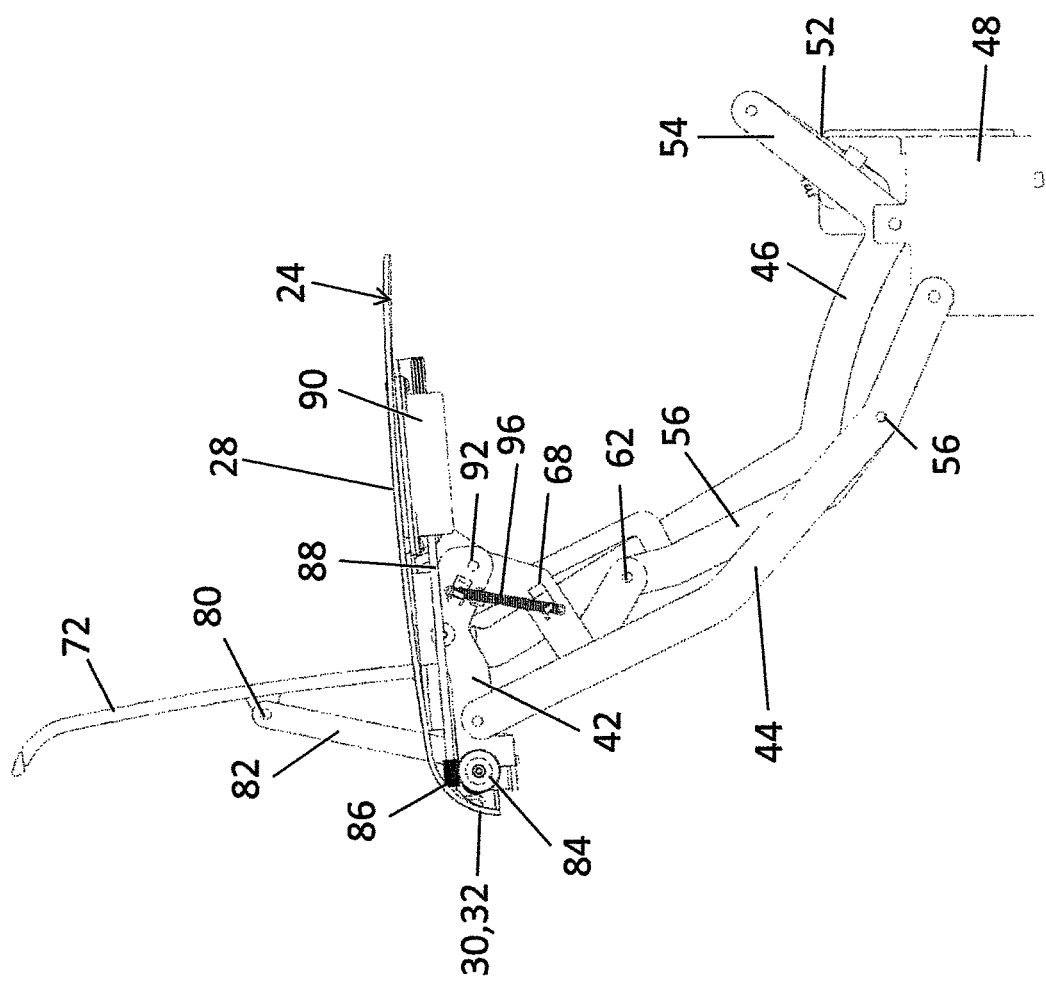
FIG. 27 shows a side view corresponding to FIG. 26 of the wind deflector arrangement, but in the loading position.
Figure 28:
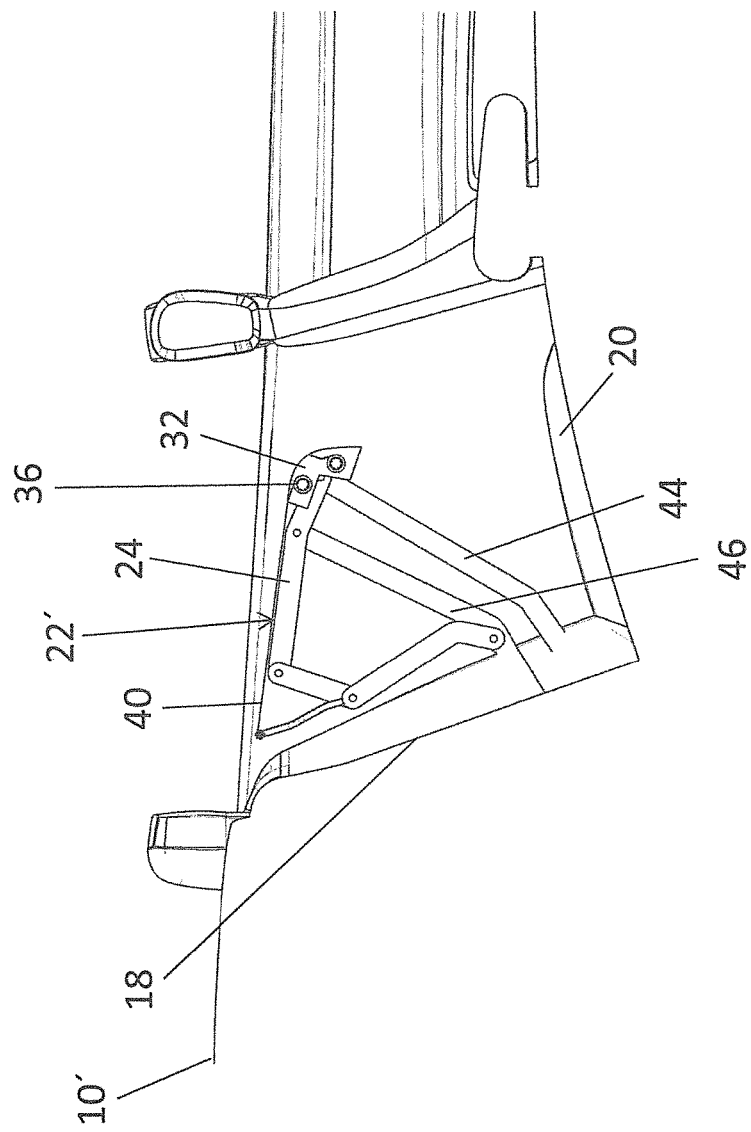
FIG. 28 shows a sectional side view of an alternative embodiment of a convertible vehicle according to the invention having a wind deflector arrangement in a function position.
Figure 29:
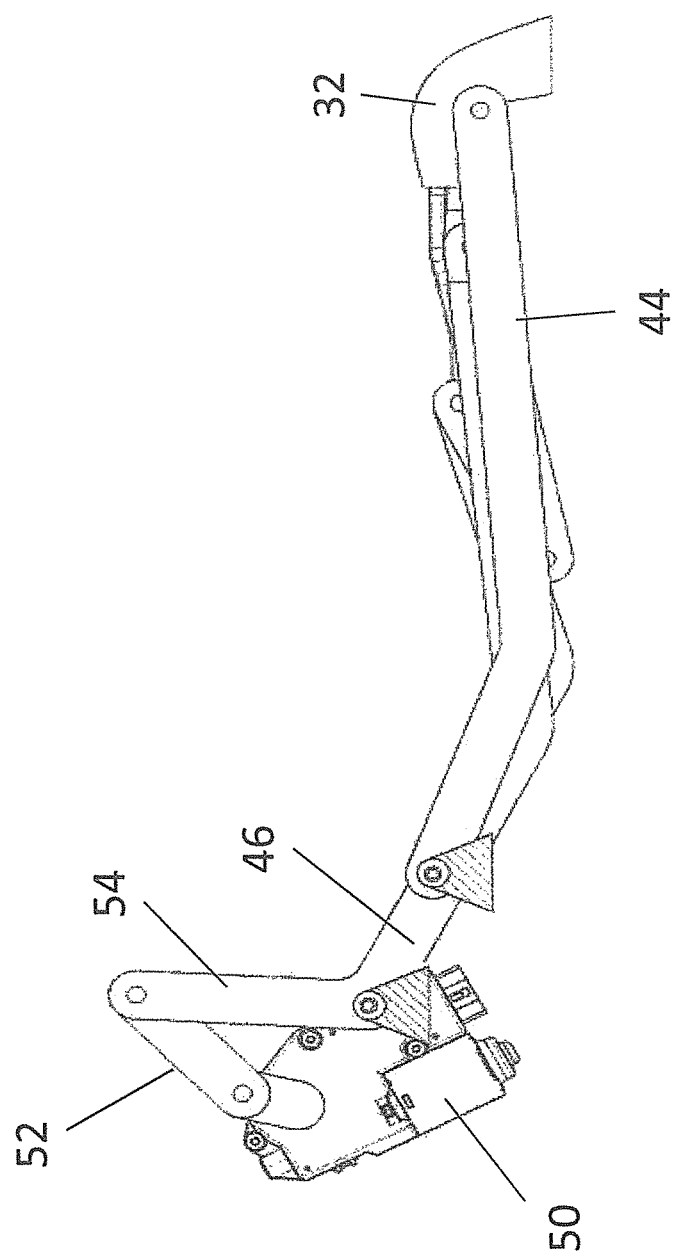
FIG. 29 shows a side view corresponding to FIG. 28 of the wind deflector arrangement of the convertible vehicle in its storage position.
Figure 30:
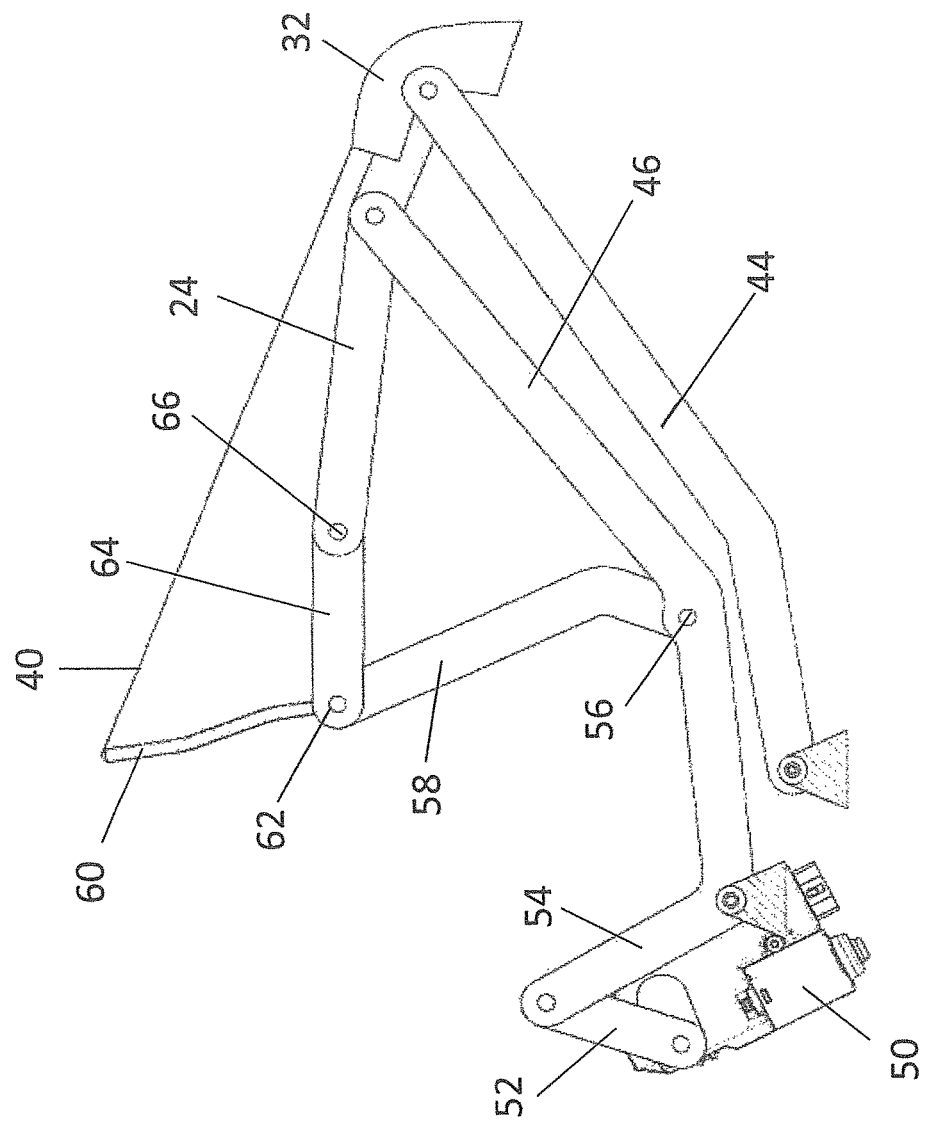
FIG. 30 shows a side view corresponding to FIG. 29 of the wind deflector arrangement in an intermediary position when being displaced from the storage position to a function position.

If an access for loading the backbench 16 is created starting from either the second function position or the first function position, a manual pressure directed towards the wind deflector casing 32 can be exerted on the clamping bracket 60, causing the loading link 68 to pivot away from the stop 94 around the point of articulation 92 via the displacing link 64. The pivoting is carried out against the force of the spring 96 over the dead center position in a second position above the dead center until the loading position illustrated in FIG. 27 is obtained, in which the roller web 40 is at least mostly wound up on its winding shaft 36 and which is maintained by the force of the spring 96, thus avoiding that the clamping bracket 60 unintentionally pivots into the thus attained loading opening during the loading procedure. In the loading position, the guide pin 100 is outside of the guide slit 98.

Displacing the wind deflector arrangement 22 back in the second function position, the first function position or the storage position, respectively, is realized in the same manner only reversed by the correspondingly reversed drive of the drive motors 50 and the displacing motors 90.

In the FIGS. 28 to 31, an alternative embodiment of a wind deflector arrangement 22' is illustrated, which is arranged in the area of a backbench 16 of a convertible vehicle 10'. The wind deflector arrangement 22' differs from the wind deflector arrangement according to the FIGS. 1 to 27 described above in that it comprises only one roller web 40 serving as a horizontal function element, said roller web 40 being able to be unwound from a winding shaft 36 as a roller web serving as a horizontal function element as described above, said winding shaft 36 being arranged in a wind deflector casing 32 of a wind deflector carrier 24. The wind deflector carrier 24 can be released from a lowered storage position, in which the wind deflector carrier 32 forms a frontal corner area of a sitting area 20 of the backbench 16, in the function position illustrated in FIG. 31, in which the roller web 40 tied to a clamping bracket 60 connected to a first displacing link 58 is unwound from the winding shaft 36, by means of two releasing links 44 and 46 according to the embodiment described above. Also corresponding to the embodiment described above, the displacing link 58 is connected to a releasing link 46 via a point of articulation 56 and connected to a second displacing link 64 via a point of articulation 62, said second displacing link 64 being connected to the wind deflector carrier 24 via a point of articulation 66. When pivoting the releasing link 44 and 46 by means of a drive motor 50 arranged in the area of a main bearing, the displacing link 58 and consequently the clamping bracket 60 are thus automatically pivoted, so that the wind deflector arrangement 22' can take up its function position shown in FIG. 28.

The invention claimed is:

1. A convertible vehicle having a backbench and a wind deflector arrangement which can be displaced between a storage position and at least one function position; comprising at least one function element comprising a roller web which is wound up on a winding device extending in the transverse direction of the vehicle when in the storage position and is unwound from the winding device when in the function position, wherein the winding device arranged at a wind deflector carrier is arranged at a frontal, forward-facing corner area of a sitting area of the backbench when in the storage position and can be released to take up the function position by means of a releasing mechanism for readjusting the wind deflector arrangement; and wherein the winding device is arranged in a wind deflector casing, forming the frontal, forward-facing corner area of the sitting area of the backbench, when in the storage position.

2. The convertible vehicle according to claim 1, wherein the wind deflector casing forms a frame leg of a wind deflector frame extending in the transverse direction of the vehicle, said deflector frame being part of the wind deflector carrier and comprising a frame leg on each of its two sides, which extend in the longitudinal direction of the vehicle regarding a vertical longitudinal center plane of the vehicle.

3. The convertible vehicle according to claim 1, wherein the releasing mechanism comprises two releasing links, one on each side of the vehicle regarding the vertical longitudinal center plane of the vehicle and forming a four-joint arrangement, said releasing links being mounted permanently to the vehicle and pivotably movable and which are connected to the wind deflector carrier.

4. A convertible vehicle having a backbench and a wind deflector arrangement which can be displaced between a storage position and at least one function position; comprising at least one function element comprising a roller web which is wound up on a winding device extending in the transverse direction of the vehicle when in the storage position and is unwound from the winding device when in the function position, wherein the winding device arranged at a wind deflector carrier is arranged at a frontal, forward-facing corner area of a sitting area of the backbench when in the storage position and can be released to take up the function position by means of a releasing mechanism for readjusting the wind deflector arrangement, wherein the function element is a horizontal function element and spans an essentially horizontal function plane when in its function position and that the horizontal function element is connected to a clamping link arrangement on each side of the vehicle regarding the vertical longitudinal center plane of the vehicle, said clamping link arrangement being coupled to the releasing mechanism.

5. The convertible vehicle according to claim 4, wherein the clamping link arrangements each comprise a first displacing link, which is articulated to the releasing mechanism on the one hand and connected to a clamping bracket on the other hand, to which the horizontal function element is tied at its edge facing away from the winding device, and a second displacing link, which is articulated to the first displacing link on the one hand and to the wind deflector carrier on the other hand.

6. A convertible vehicle having a backbench and a wind deflector arrangement which can be displaced between a storage position and at least one function position; comprising at least one function element comprising a roller web which is wound up on a winding device extending in the transverse direction of the vehicle when in the storage position and is unwound from the winding device when in the function position, wherein the winding device arranged at a wind deflector carrier is arranged at a frontal, forward-facing corner area of a sitting area of the backbench when in the storage position and can be released to take up the function position by means of a releasing mechanism for readjusting the wind deflector arrangement, wherein the function element is a vertical function element and spans an essentially vertical function plane and the wind deflector carrier comprises a displacing mechanism for the vertical function element.

7. The convertible vehicle according to claim 6, wherein the displacing mechanism comprises a releasing bracket which comprises a transverse leg, at which an edge of the vertical function element is fastened, and two releasing arms, whose ends facing away from the transverse leg are each mounted movably at the wind deflector carrier in the longitudinal direction of the vehicle.

8. The convertible vehicle according to claim 7, wherein the releasing arms are each mounted on a spindle nut which engages with a threaded spindle driven by a corresponding displacement motor.

9. The convertible vehicle according to claim 7, wherein a supporting link is articulated to each of the releasing arms, said supporting link being articulated to the wind deflector carrier by its end facing away from the corresponding releasing arm.

10. The convertible vehicle according to claim 9, wherein the supporting links are driven by a displacing motor.

11. The convertible vehicle according to claim 10, wherein the displacing motor drives a worm gear which comprises a gear connected to the supporting link in a torque-proof manner.

12. The convertible vehicle according to claim 5, wherein the wind deflector carrier comprises a loading link on each side connected to the corresponding second displacing link, so that the first displacing link is pivotable from the function position to a loading position when the releasing links are fixed.

13. The convertible vehicle according to claim 10, wherein when in the function position of the horizontal function element, a loading link on each side connected to a corresponding second displacing link and a coupling element formed at the wind deflector carrier, to which coupling element two releasing links, one on each side of the vehicle regarding the vertical longitudinal center plane of the vehicle and forming a four-joint arrangement are articulated, take up a position above the dead center defined by a stop.

14. The convertible vehicle according to claim 11, wherein the position above the dead center and the loading position are secured by means of a spring tied to a loading link on each side connected to the corresponding second displacing link and the wind deflector carrier.

15. The convertible vehicle according to claim 10, wherein a loading link on each side connected to a corresponding second displacing link comprises a guide slit in which a corresponding guide pin of a releasing link is guided when displacing the wind deflector carrier between the lowering position and the lifting position.

* * * * *